(12) United States Patent
Kosuda et al.

(10) Patent No.: US 10,494,957 B2
(45) Date of Patent: Dec. 3, 2019

(54) EVAPORATOR, RANKINE CYCLE APPARATUS, AND COMBINED HEAT AND POWER SYSTEM

(71) Applicant: PANASONIC INTELLECTUAL PROPERTY MANAGEMENT CO., LTD., Osaka (JP)

(72) Inventors: Osamu Kosuda, Osaka (JP); Atsuo Okaichi, Osaka (JP); Osao Kido, Kyoto (JP); Takumi Hikichi, Osaka (JP); Takahiro Nakamura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 60 days.

(21) Appl. No.: 15/835,796

(22) Filed: Dec. 8, 2017

(65) Prior Publication Data

US 2018/0100411 A1    Apr. 12, 2018

Related U.S. Application Data

(62) Division of application No. 14/730,284, filed on Jun. 4, 2015, now Pat. No. 9,869,208.

(30) Foreign Application Priority Data

Jun. 20, 2014    (JP) .................................. 2014-126930

(51) Int. Cl.
*F01K 13/02* (2006.01)
*F22B 21/26* (2006.01)
(Continued)

(52) U.S. Cl.
CPC ................ *F01K 13/02* (2013.01); *F01K 7/16* (2013.01); *F01K 9/003* (2013.01); *F01K 13/003* (2013.01);
(Continued)

(58) Field of Classification Search
CPC .......... F22B 21/26; F22B 21/28; F22B 27/08; F22B 27/10; F22B 1/16; F22B 1/167;
(Continued)

(56) References Cited

U.S. PATENT DOCUMENTS 3,163,153 A    12/1964    Griffin
3,219,017 A    11/1965    Thybault
(Continued)

FOREIGN PATENT DOCUMENTS

DE    102005054155 A1    5/2006
JP    57-179509 A    11/1982
(Continued)

OTHER PUBLICATIONS

The Extended European Search Report dated Oct. 28, 2015 for the related European Patent Application No. 15171741.0.
(Continued)

*Primary Examiner* — Mark A Laurenzi
*Assistant Examiner* — Xiaoting Hu
(74) *Attorney, Agent, or Firm* — McDermott Will & Emery LLP

(57) ABSTRACT

An evaporator which heats working fluid with high-temperature fluid to evaporate the working fluid includes: a working fluid channel arranged in a flow direction of the high temperature fluid and through which the working fluid flows; and a temperature sensor provided for the working fluid channel. A part of the working fluid channel is exposed to outside of a housing of the evaporator, and the temperature sensor is provided in the part of the working fluid channel exposed to the outside of the housing of the evaporator in a region other than an inlet of the working fluid channel into which the working fluid flows from the outside of the evaporator and other than an outlet of the working fluid channel through which the working fluid flows out of
(Continued)

the evaporator. The output value of the temperature sensor is used to adjust the temperature of the working fluid.

3 Claims, 19 Drawing Sheets

(51) Int. Cl.
| | |
|---|---|
| *F01K 13/00* | (2006.01) |
| *F22B 1/16* | (2006.01) |
| *F01K 25/08* | (2006.01) |
| *F22B 21/24* | (2006.01) |
| *F22B 37/10* | (2006.01) |
| *F01K 7/16* | (2006.01) |
| *F01K 9/00* | (2006.01) |
| *F01K 15/00* | (2006.01) |
| *F01K 17/02* | (2006.01) |

(52) U.S. Cl.
CPC .............. *F01K 15/00* (2013.01); *F01K 17/02* (2013.01); *F01K 25/08* (2013.01); *F22B 1/16* (2013.01); *F22B 21/24* (2013.01); *F22B 21/26* (2013.01); *F22B 37/103* (2013.01); *Y02E 20/14* (2013.01)

(58) Field of Classification Search
CPC . F22B 1/18; Y02E 20/14; F01K 13/02; F01K 13/003; F01K 15/00; F01K 25/08; F01K 25/10; F28F 13/06; F24H 1/43; F28D 1/0472; F28D 7/02; F28D 7/022; F28D 7/024; F28D 7/026; F28D 7/028
See application file for complete search history.

(56) References Cited

U.S. PATENT DOCUMENTS

| | | | |
|---|---|---|---|
| 4,065,967 A | 1/1978 | Beeston | |
| 4,425,762 A | 1/1984 | Wakamatsu et al. | |
| 4,791,889 A | 12/1988 | Matsko et al. | |
| 5,307,766 A * | 5/1994 | Pearce | F22G 5/12 |
| | | | 122/406.4 |
| 2003/0213854 A1 | 11/2003 | Stickford et al. | |
| 2005/0274113 A1 | 12/2005 | Sekiai et al. | |
| 2008/0186039 A1* | 8/2008 | Cannas | F24H 1/43 |
| | | | 324/750.28 |
| 2011/0083619 A1 | 4/2011 | Master et al. | |
| 2012/0073520 A1 | 3/2012 | Bruckner et al. | |
| 2015/0267569 A1 | 9/2015 | Hikichi et al. | |

FOREIGN PATENT DOCUMENTS

| | | |
|---|---|---|
| JP | 63-290302 A | 11/1988 |
| JP | 64-046502 A | 2/1989 |
| JP | 7-012302 A | 1/1995 |
| JP | 2012-529613 A | 11/2012 |
| WO | 2014/087639 A1 | 6/2014 |

OTHER PUBLICATIONS

Non-Final Office Action issued in U.S. Appl. No. 14/730,284, dated Mar. 15, 2017.
Notice of Allowance issued in U.S. Appl. No. 14/730,284, dated Sep. 26, 2017.

* cited by examiner

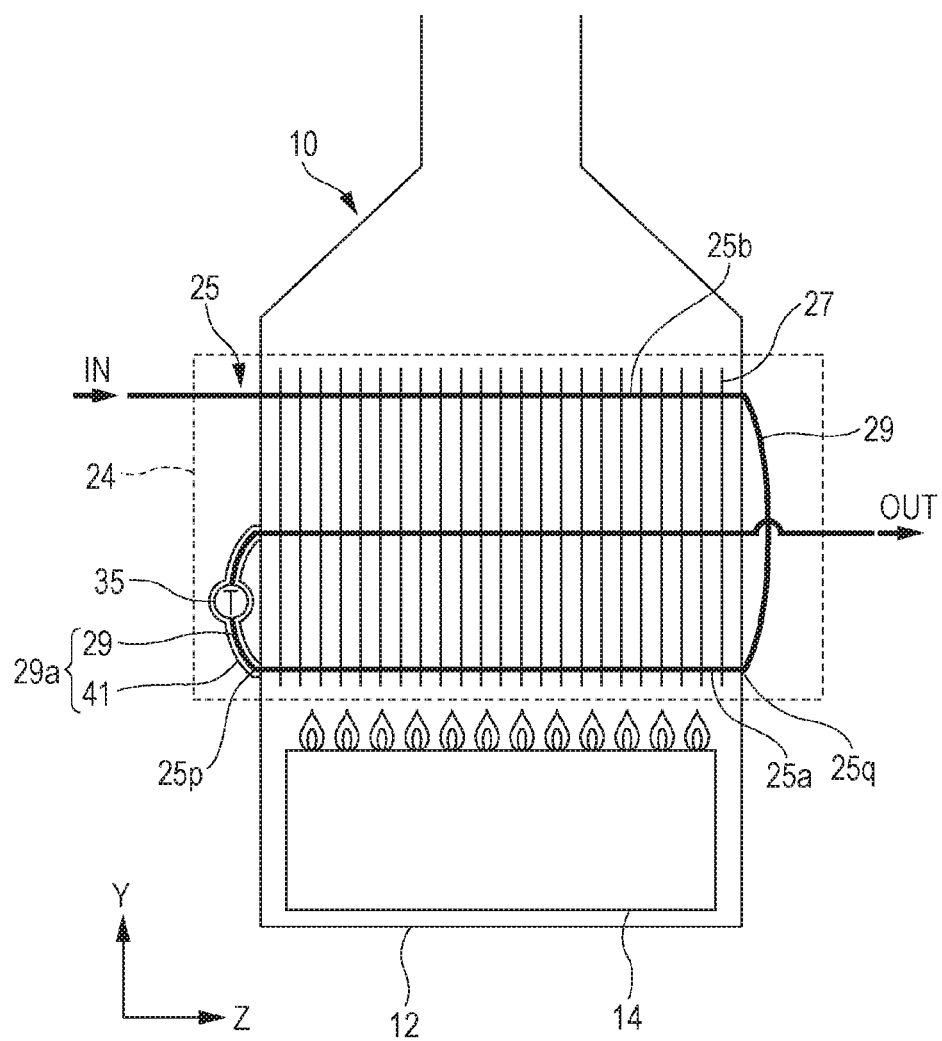

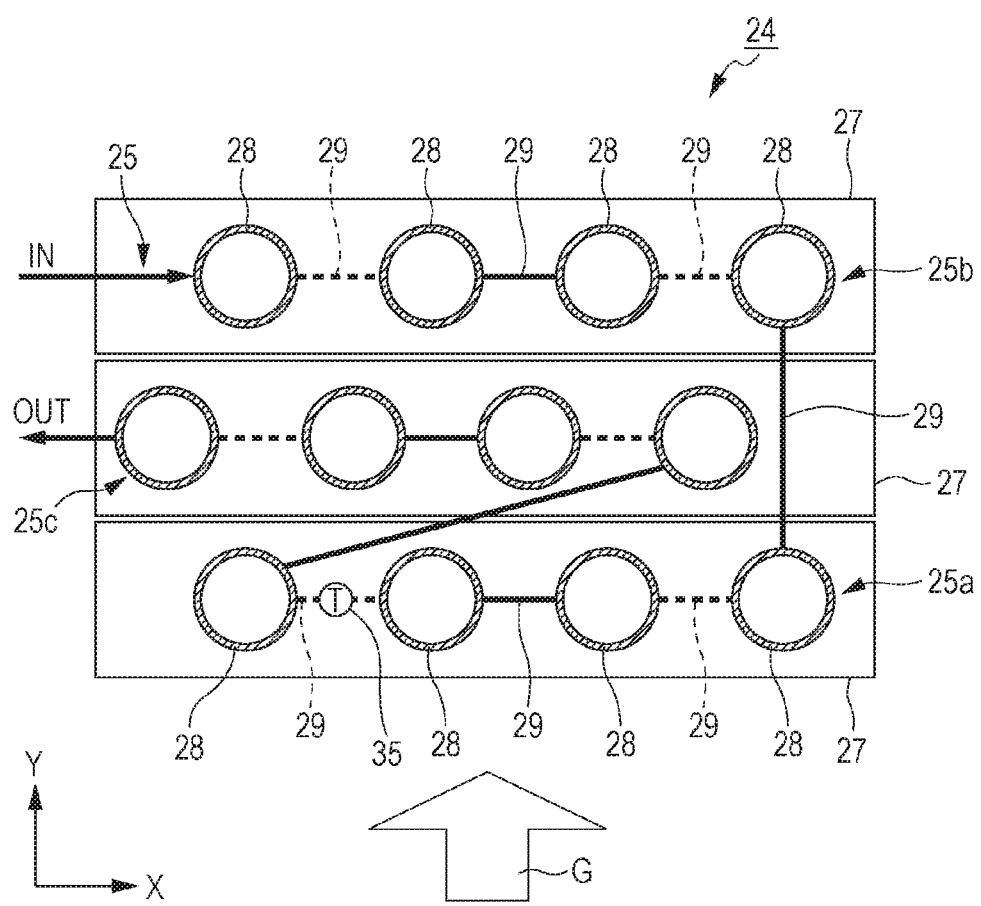

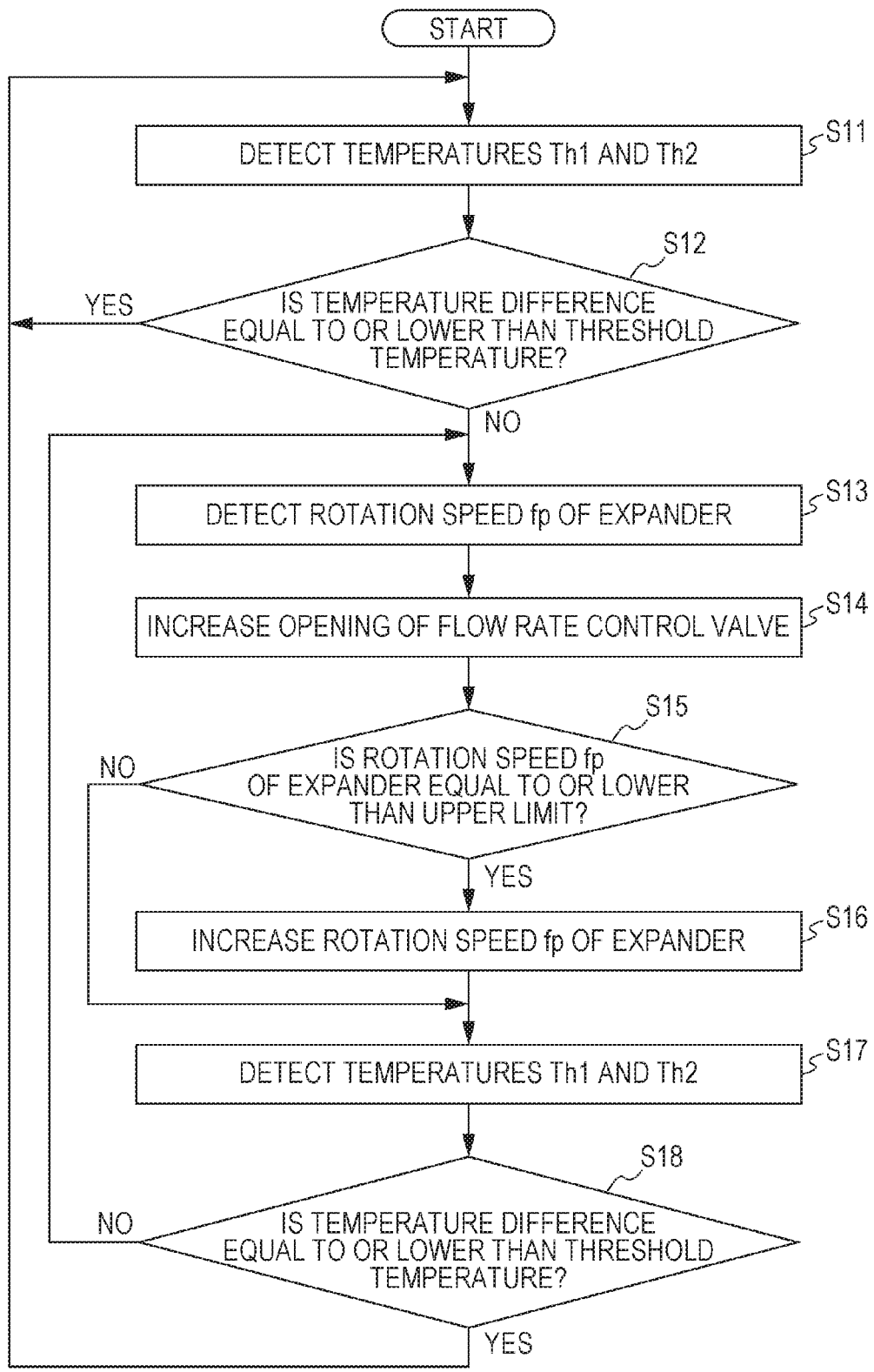

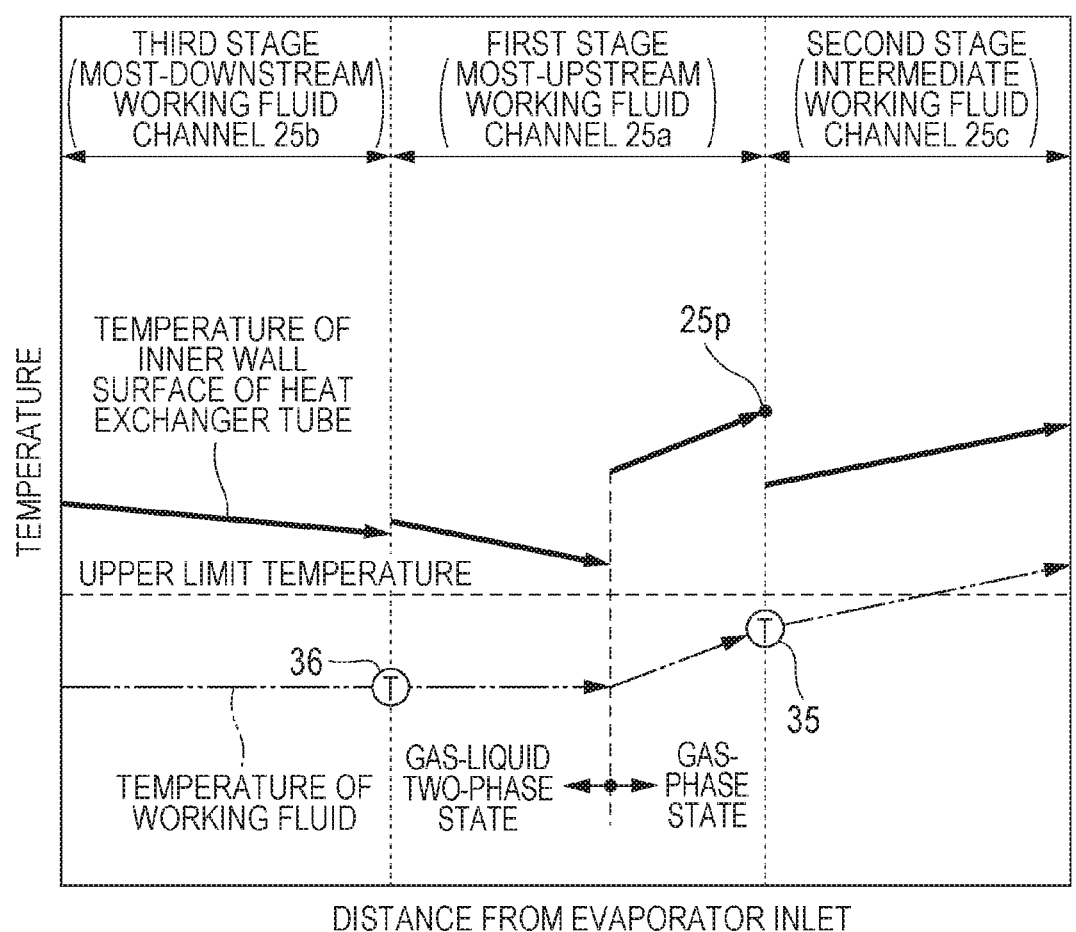

EVAPORATOR, RANKINE CYCLE APPARATUS, AND COMBINED HEAT AND POWER SYSTEM

RELATED APPLICATIONS

This application is a Divisional application of U.S. patent application Ser. No. 14/730,284, filed on Jun. 4, 2015, now U.S. Pat. No. 9,869,208, which in turn claims the benefit of Japanese Application No. 2014-126930, filed on Jun. 20, 2014, the entire disclosures of which Applications are incorporated by reference herein.

BACKGROUND

Technical Field

The disclosure relates to an evaporator, a Rankine cycle apparatus, and a combined heat and power system.

Description of the Related Art

As well known by those skilled in the art, a Rankine cycle is a theoretical cycle with a steam turbine. Research and development on the Rankine cycle have been conducted for a long time. On the other hand, as described in U.S. Patent Application Publication No. 2003/0213854 (hereinafter referred to as a Patent Literature 1), research and development have been also carried out for a combined heat and power system which employs the Rankine cycle. The combined heat and power system (hereinafter referred to a CHP system) is a system which simultaneously provides plural forms of energy, such as heat and power, generated from one or plural resources. In recent years, attention has been focused on not only large-scale CHP systems but also CHP systems which are installed in relatively small facilities such as hospitals, schools, and libraries and, moreover, focused on household CHP systems (so called micro CHP systems).

SUMMARY

The CHP system of Patent Literature 1 is configured to obtain electric power by using combustion gas generated by a gas boiler as heat energy for a Rankine cycle apparatus. Moreover, Patent Literature 1 discloses a structure of an evaporator to prevent gas-phase organic working fluid from being excessively heated by the boiler.

The evaporator disclosed in Patent Literature 1 may be effective when the Rankine cycle apparatus is operating stably. However, the configuration disclosed in Patent Literature 1 is not enough to prevent the working fluid from being heated excessively.

One non-limiting and exemplary embodiment provides a new technique to prevent working fluid from being excessively heated in the evaporator.

In one general aspect, the techniques disclosed here feature an evaporator which heats working fluid with high-temperature fluid to evaporate the working fluid, the evaporator including:

a working fluid channel which is arranged to form a plurality of stages in a flow direction of the high-temperature fluid and through which the working fluid flows, wherein the evaporator further including a first temperature sensor which is provided for the working fluid channel, the working fluid channel is arranged to form a meander shape in the plurality of stages, and bent portions of the meander shape are exposed to the outside of a housing of the evaporator, the plurality of stages include a first stage located most upstream in the flow direction of the high-temperature fluid and a stage other than the first stage, the working fluid channel allows the working fluid to flow out of the evaporator through an outlet of the working fluid channel which is included in the stage other than the first stage, the first temperature sensor is provided downstream of a particular point in the flow direction of the working fluid in a part of the working fluid channel exposed to the outside of the housing of the evaporator, the particular point being at a distance of L/2 upstream in the flow direction of the working fluid from the downstream end of the part of the working fluid channel forming the first stage where L is whole length of working fluid channel forming the first stage, and an output value of the first temperature sensor is used to adjust temperature of the working fluid in the evaporator.

The evaporator described above may prevent working fluid from being heated excessively.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2A is a configuration diagram of an evaporator of a Rankine cycle apparatus illustrated in FIG. 1;

FIG. 2C is a schematic plan view of an evaporator according to a modification;

FIG. 7 is a flowchart of a control executed by a control circuit;

FIG. 8 is a diagram showing a relationship between the temperature of working fluid and the temperature of inner wall surfaces of heat exchanger tubes in the evaporator;

DETAILED DESCRIPTION

Underlying Knowledge Forming Basis of the Present Disclosure

In an evaporator of a Rankine cycle apparatus, excessive heat exchange between high-temperature fluid such as combustion gas generated by a gas burner and gas-phase working fluid could cause problems including thermal decomposition of the working fluid, deterioration of lubricant oil, and the like. Such problems become pronounced when using organic working fluid or when using an expander requiring lubricant oil.

Figure 15:
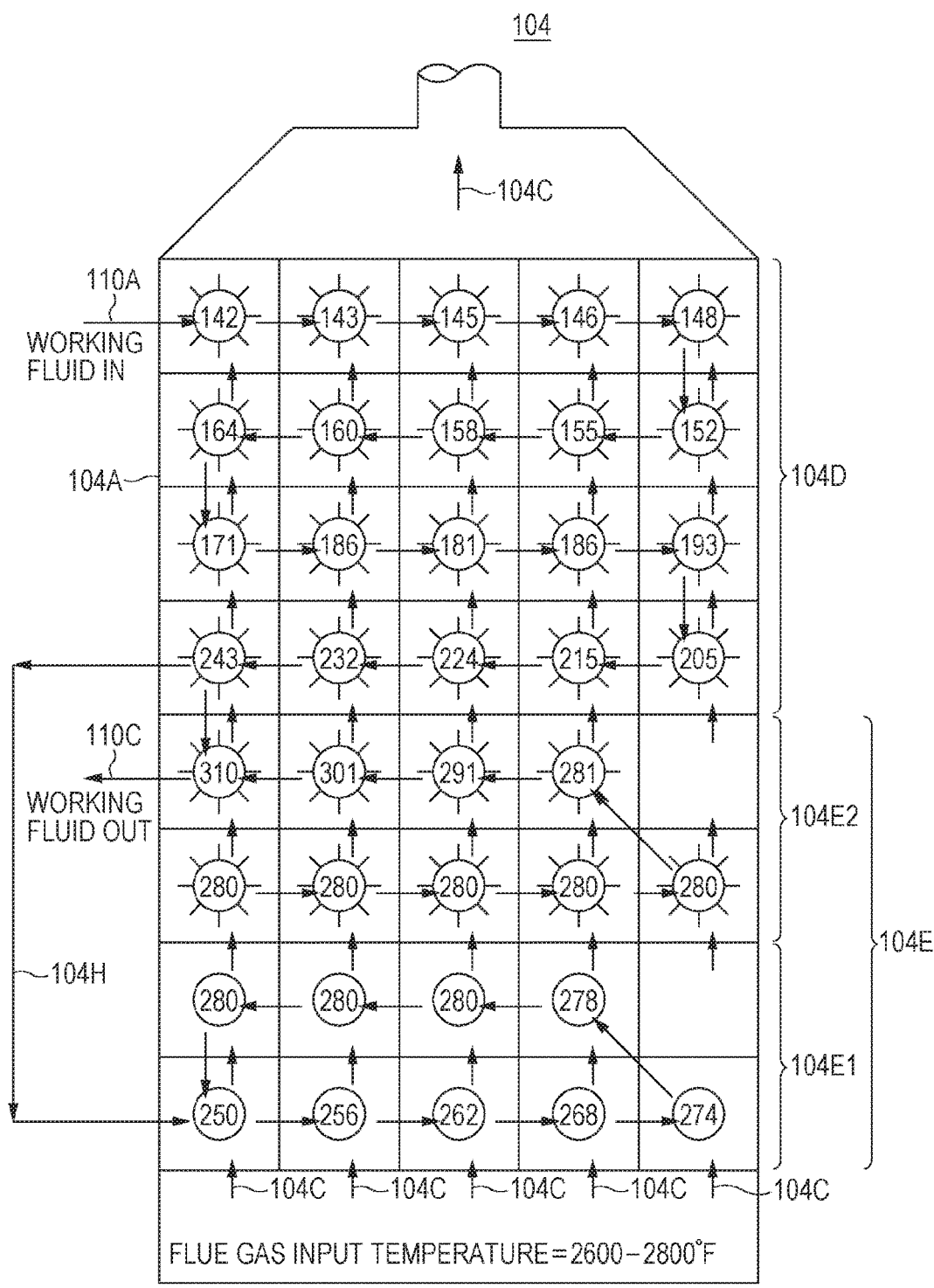
FIG. 15 is a configuration diagram of an evaporator of a conventional Rankine cycle apparatus.

To avoid the aforementioned problems, Patent Literature 1 proposes an evaporator 104 having a structure illustrated in FIG. 15. The evaporator 104 is provided with an inlet 110A for working fluid in the downstream region of flow channels 104C for high-temperature fluid (combustion gas generated by a burner). The working fluid flowing into a distal side 104D through the inlet 110A exchanges heat with the high-temperature fluid in a countercurrent manner. The working fluid is then fed through a connecting tube 104H to a proximal side 104E, which is located in the upstream side of the flow channels 104C for the high-temperature fluid. In the proximal side 104E, the working fluid flows through first and second sections 104E1 and 104E2 in this order. In the proximal side 104E, the working fluid thus exchanges heat with the high-temperature fluid in a parallel-flow manner. An outlet 110C for the working fluid is provided near the center of an enclosure 104A. The numerals in the circles (representing heat exchanger tubes) show examples of the temperature (degree Fahrenheit) of the working fluid.

According to the evaporator 104 illustrated in FIG. 15, it is inferred that the working fluid can be prevented from being heated excessively. This is because the working fluid is inferred to be in the liquid-phase state in the distal side 104D, be in the liquid-phase state or gas-liquid two-phase state in the first section 104E1, and be in the gas-liquid two-phase state or gas-phase state in the second section 104E2. However, the inference is only possible for the Rankine cycle apparatus being in stable operation. For example, when the circulation flow rate of the working fluid is reduced with a change in electricity demand, the working fluid can change to the gas-phase state already in the first section 104E1. In the first section 104E1, the gas-phase working fluid could be therefore heated excessively.

Reducing the heat of the burner in accordance with the circulation flow rate of the working fluid is one of the effective means but is not adequate from the viewpoint of responsiveness. In recent years, moreover, attempts to use solid fuel, such as biomass or wood pellets, instead of gas fuel are being studied. The combustion of solid fuel in pellet boilers is not as stable as combustion of gas fuel in gas boilers. Moreover, the pellet boilers are not suitable for quickly increasing or reducing the heat. The technique to prevent the working fluid from being heated excessively is therefore becoming more important. Based on the aforementioned knowledge, the inventor reaches the invention of each aspect described below.

An evaporator according to a first aspect of the disclosure is the evaporator which heats working fluid with high-temperature fluid to evaporate the working fluid, the evaporator including: a working fluid channel which is arranged to form a plurality of stages in a flow direction of the high-temperature fluid and through which the working fluid flows; and a first temperature sensor which is provided for the working fluid channel. The working fluid channel is arranged to form a meander shape in the plurality of stages, and bent portions of the meander shape are exposed to the outside of a housing of the evaporator. The plurality of stages include a first stage located most upstream in the flow direction of the high-temperature fluid and a stage other than the first stage. The working fluid channel allows the working fluid to flow out of the evaporator through an outlet of the working fluid channel which is included in the stage other than the first stage. The first temperature sensor is provided downstream of a particular point in the flow direction of the working fluid in a part of the working fluid channel exposed to the outside of the housing of the evaporator, the particular point being at a distance of L/2 upstream in the flow direction of the working fluid from the downstream end of the working fluid channel forming the first stage where L is whole length of the part of the working fluid channel forming the first stage. The output value of the first temperature sensor is used to adjust temperature of the working fluid in the evaporator.

As previously described, working fluid is thermally decomposed at a predetermined temperature or higher. It is therefore necessary to keep the temperature of the inner wall surface of the working fluid channel lower than the predetermined temperature. According to the first aspect, the temperature of the inner wall surface of the working fluid channel in the evaporator can be kept lower than the predetermined temperature by using the output value of the first temperature sensor to adjust the temperature of the working fluid in the evaporator. The working fluid can be therefore prevented from being thermally decomposed. The reason because the evaporator according to the first aspect exerts the aforementioned effect is described in detail below.

In the process of the working fluid channel being heated by the high-temperature fluid, how likely the temperature of the inner wall surface of the working fluid channel is to increase depends on the state of the working fluid flowing through the working fluid channel. Specifically, the temperature of the inner wall surface of the working fluid channel is more likely to increase when the working fluid flowing through the working fluid channel is in the gas-phase state than in the gas-liquid two-phase state. This is because the inner wall surface of the working fluid channel has a lower heat transfer coefficient when the working fluid flowing through the same working fluid channel is in the gas-phase state than in the gas-liquid two-phase state. When the working fluid is in the gas-liquid two-phase state, the inner wall surface of the working fluid channel has a high enough heat transfer coefficient. Accordingly, heat transfer to the working fluid prevents an increase in temperature of the inner wall surface. On the other hand, when the working fluid is in the gas-phase state, the inner wall surface of the working fluid channel has a low heat transfer coefficient. Accordingly, heat transfer to the working fluid is small, and the temperature of the inner wall surface increases.

The evaporator generates working fluid in the gas-phase state from working fluid in the partially liquid-phase state. The ratio of gas-phase working fluid in the working fluid channel therefore increases downstream in the flow direction of the working fluid.

The outlet of the working fluid channel which allows the working fluid to flow out of the evaporator is located most downstream in the flow direction of the working fluid. In an evaporator in which the working fluid channel is arranged to form the plurality of stages in the flow direction of the high-temperature fluid, the stage including the outlet of the working fluid channel, which allows the working fluid to flow out of the evaporator, is located on the relatively downstream portion in the flow direction of the working fluid. Accordingly, the stage including the outlet of the working fluid channel, which allows the working fluid to flow out of the evaporator, includes a higher ratio of gas-phase working fluid in the working fluid channel than the another stage.

Moreover, in an evaporator, the high-temperature fluid increases in temperature upstream in the flow direction of the high-temperature fluid.

Accordingly, in the evaporator in which the working fluid channel is arranged to form the plurality of stages in the flow direction of the high-temperature fluid, locating the stage including the outlet of the working fluid channel, which allows the working fluid to flow out of the evaporator, most upstream in the flowing direction of the high-temperature fluid means that the stage including a part of the working fluid channel which is most likely to increase in temperature is provided in the hottest place. Accordingly, the temperature of the inner wall surface of the working fluid channel forming the same stage is more likely to exceed the decomposition temperature of the working fluid, causing thermal decomposition of the working fluid.

On the other hand, the evaporator of the first aspect includes: the first stage located most upstream in the flow direction of the high-temperature fluid; and the stage other than the first stage. The working fluid flows out of the evaporator through the outlet of the working fluid channel included in the stage other than the first stage. In other words, the first stage is located most upstream in the flow direction of the high-temperature fluid, but the stage including the outlet of the working fluid channel, which allows the working fluid to flow out of the evaporator, is not located most upstream. This can reduce the risk that the temperature of the inner wall surface of the working fluid channel will increase to the decomposition temperature of the working fluid or higher.

Moreover, the evaporator of the disclosure includes the first temperature sensor, which is provided downstream of a particular point in the flow direction of the working fluid in a part of the working fluid channel exposed to the outside of the housing of the evaporator. Herein, the particular point is at a distance of L/2 (L is whole length of the part of the working fluid channel forming the first stage) upstream in the flow direction of the working fluid from the downstream end of the part of the working fluid channel forming the first stage. The working fluid can be therefore prevented from being excessively heated and thermally decomposed. The reason therefor is described below.

When the working fluid changes from the gas-liquid two-phase state to the gas-phase state in the first stage, which is located most upstream in the flow direction of the high-temperature fluid, the temperature of the inner wall surface of the working fluid channel is the highest at the downstream end of the part of the working fluid channel forming the first stage because of the following reason.

As previously described, the temperature of the inner wall surface of the working fluid channel is more likely to increase when the working fluid flowing through the same working fluid channel is in the gas-phase state than in the gas-liquid two-phase state. When the working fluid changes from the gas-liquid two-phase state to the gas-phase state in the first stage, the inner surface of a part of the working fluid channel through which gas-phase working fluid flows is more likely to increase in temperature. Moreover, as previously described, the high-temperature fluid increases in temperature upstream in the flow direction of the high-temperature fluid. Since the first stage is located most upstream in the flow direction of the high-temperature fluid, the part of the working fluid channel forming the first stage is exposed to higher temperature than the another stage. Furthermore, since the working fluid flows through the working fluid channel while exchanging heat with the high-temperature fluid in the evaporator, the working fluid increases in temperature toward the downstream portion of the working fluid channel. The downstream end of the part of the working fluid channel forming the first stage therefore has the highest temperature in the part of the working fluid channel forming the first stage. Accordingly, when the state of the working fluid changes from the gas-liquid two-phase state to the gas-phase state in the first stage, which is located most upstream in the flow direction of the high-temperature fluid, the temperature of the inner wall surface of the working fluid channel is the highest at the downstream end of the part of the working fluid channel forming the first stage.

In the evaporator of the first aspect, the first temperature sensor is provided downstream of the particular point, which is at a distance of L/2 (L is whole length of the part of the working fluid channel arranged in the first stage) upstream in the flow direction of the working fluid from the downstream end of the part of the working fluid channel forming the first stage, in the flow direction of the working fluid in a part of the working fluid channel exposed to the outside of the housing of the evaporator. By using the first temperature sensor, the evaporator of the first aspect can acquire the temperature of the working fluid at a portion in a range of L/2 upstream in the flow direction of the working fluid from the downstream end. Accordingly, based on the output value of the first temperature sensor, the temperature of the inner wall surface of the working fluid channel at the downstream end, which has the highest temperature in the inner wall surface of the working fluid channel, can be easily predicted (see FIGS. 4 and 8). The working fluid can be therefore prevented from being excessively heated and thermally decomposed by using the output value of the first temperature sensor to adjust the temperature of the working fluid.

In a second aspect, for example, the first temperature sensor of the evaporator according to the first aspect may be provided in a region of L/2 downstream in the flow direction of the working fluid from the downstream end of the part of the working fluid channel forming the first stage.

According to the second aspect, the place where the first temperature sensor is provided is within the region of L/2 downstream in the flow direction of the working fluid from the downstream end of the part of the working fluid channel forming the first stage. Accordingly, the place where the first temperature sensor is provided is limited to the vicinity of the downstream end. This can facilitate prediction of the temperature of the inner wall surface of the working fluid channel at the downstream end.

In a third aspect, for example, the plurality of stages of the evaporator according to the first aspect may include a second stage located next to the first stage downstream in the flow direction of the high-temperature fluid, and the first temperature sensor may be provided between the first and second stages.

According to the third aspect, the place where the first temperature sensor is provided is limited to between the first stage and the second stage located next to the first stage downstream in the flow direction of the high-temperature fluid. Accordingly, the place where the first temperature sensor is provided is limited to an area closer to the downstream end, thus further facilitating prediction of the temperature of the inner wall surface of the working fluid channel at the downstream end.

In a fourth aspect, for example, the plurality of stages of the evaporator according to any one of the first to third aspects may include a third stage which is located most downstream in the flow direction of the high-temperature fluid. The working fluid channel may allow the working fluid to enter the evaporator through an inlet of the working fluid channel which is included in the third stage.

According to the fourth aspect, the working fluid flows into the evaporator through the inlet of the working fluid channel included in the third stage. The high-temperature fluid and the working fluid flowing through the working fluid channel can thereby exchange heat efficiently.

In a fifth aspect, the working fluid channel of the evaporator according to any one of the first to fourth aspects may include a plurality of heat exchanger tubes provided within the housing of the evaporator and a plurality of connecting tubes corresponding to the bent portions of the meander shape.

In a sixth aspect, at least the part of the working fluid channel forming the first stage in the evaporator according to the first to fifth aspects may be an inner grooved pipe.

According to the sixth aspect, the working fluid swirls in the inner grooved pipe. The swirling flow can reduce a local increase in temperature of the working fluid in the inner grooved pipe.

In a seventh aspect, the evaporator according to the first to sixth aspects may further include a heat insulator surrounding the first temperature sensor so that the heat insulator reduces thermal influence of an environment around the evaporator on the first temperature sensor.

According to the seventh aspect, the temperature of the working fluid can be accurately detected.

In an eighth aspect, the evaporator according to the first to sixth aspects may further include a partition provided between the first temperature sensor and an environment around the evaporator, in which the partition reduces thermal influence of the environment around the evaporator on the first temperature sensor.

According to the eighth aspect, the temperature of the working fluid can be accurately detected.

In a ninth aspect, thermal influence of an environment around the evaporator according to the first to sixth aspects on the first temperature sensor may be reduced.

According to the ninth aspect, the temperature of the working fluid can be accurately detected.

In a tenth aspect, the evaporator according to the first to ninth aspects may be a fin tube heat exchanger.

A Rankine cycle apparatus according to an eleventh aspect includes: a pump which pressurizes the working fluid; the evaporator according to any one of the first to tenth aspects which receives the working fluid discharged from the pump; an expander which expands the working fluid heated by the evaporator; a condenser which cools the working fluid discharged from the expander; and a control circuit.

According to the eleventh aspect, the same effect as that of the first aspect can be obtained.

In a twelfth aspect, for example, the control circuit of the Rankine cycle apparatus according to the eleventh aspect may reduce supply of the high-temperature fluid when the temperature acquired by the first temperature sensor in the evaporator is not lower than a predetermined value and increase the supply of the high-temperature fluid when the temperature acquired by the first temperature sensor in the evaporator is lower than the predetermined value.

In a thirteenth aspect, for example, the control circuit of the Rankine cycle apparatus according to the eleventh aspect may increase rotation speed of the pump when the temperature acquired by the first temperature sensor in the evaporator is not lower than a predetermined value and reduce the rotation speed of the pump when the temperature acquired by the first temperature sensor in the evaporator is lower than the predetermined value.

In a fourteenth aspect, for example, the control circuit of the Rankine cycle apparatus according to the eleventh aspect may increase rotation speed of the expander when the temperature acquired by the first temperature sensor in the evaporator is not lower than a predetermined value and reduce the rotation speed of the expander when the temperature acquired by the first temperature sensor in the evaporator is lower than the predetermined value.

In a fifteenth aspect, for example, the Rankine cycle apparatus according to the eleventh aspect may further include a control valve capable of controlling a circulation flow rate of the working fluid, in which the control circuit increases an opening of the control valve when the temperature acquired by the first temperature sensor in the evaporator is not lower than a predetermined value and reduces the opening of the control valve when the temperature acquired by the first temperature sensor in the evaporator is lower than the predetermined value.

In a sixteenth aspect, the control circuit of the Rankine cycle apparatus according to the eleventh aspect may reduce temperature of the high-temperature fluid when the temperature acquired by the first temperature sensor in the evaporator is not lower than a predetermined value and increase the temperature of the high-temperature fluid when the temperature acquired by the first temperature sensor in the evaporator is lower than the predetermined value.

In another aspect, for example, the Rankine cycle apparatus according to the eleventh aspect may further include a fan which is provided within the evaporator and supplies air to the high-temperature fluid. The control circuit may increase the rotation speed of the fan to lower the temperature of the high-temperature fluid when the temperature acquired by the first temperature sensor in the evaporator is not lower than a predetermined value and reduce the rotation speed of the fan to increase the temperature of the high-temperature fluid when the temperature acquired by the first temperature sensor in the evaporator is lower than the predetermined value.

According to the twelfth to sixteenth aspects, the working fluid can be prevented from being excessively heated.

In a seventeenth aspect, for example, the evaporator according to any one of the first to third aspects may further include a second temperature sensor which is different from the first temperature sensor and is provided upstream of the first stage in a part of the working fluid channel exposed to the outside of the housing the evaporator. The output values of the first and second temperature sensors can be used to adjust the temperature of the working fluid in the evaporator.

According to the seventeenth aspect, the two temperature sensors are used, thus implementing more accurate temperature control. Moreover, the state of the working fluid in the working fluid channel (the most-upstream portion of the working fluid channel in particular) can be accurately known based on the difference between the temperatures detected by the first and second temperature sensors.

In an eighteenth aspect, for example, the temperature of the high-temperature fluid of the Rankine cycle apparatus according to any one of the eleventh to sixteenth aspects may be higher than decomposition temperature of the working fluid.

The higher the high-temperature fluid, the higher the operation efficiency of the Rankine cycle apparatus.

In a nineteenth aspect, for example, the working fluid of the Rankine cycle apparatus according to any one of the eleventh to sixteenth and eighteenth aspects may be organic working fluid.

According to the nineteenth aspect of the disclosure, by employing the organic working fluid, the Rankine cycle apparatus can be configured by using a comparatively low-temperature heat source as well as the high-temperature heat source, such as a boiler.

A CHP system according to a twentieth aspect includes: the Rankine cycle apparatus according to any one of the eleventh to sixteenth, eighteenth, and nineteenth aspects; and a heat medium circuit in which a heat medium flows as a low-temperature heat source cooling the working fluid in the condenser of the Rankine cycle apparatus.

An evaporator according to a twenty-first aspect is the evaporator which heats working fluid with high-temperature fluid to evaporate the working fluid, the evaporator including: a working fluid channel which is arranged in the flow direction of the high temperature fluid and through which the working fluid flows; and a temperature sensor provided for the working fluid channel. A part of the working fluid channel is exposed to the outside of a housing of the evaporator. The temperature sensor is provided in the part of the working fluid channel exposed to the outside of the housing of the evaporator in a region other than an inlet of the working fluid channel into which the working fluid flows from the outside of the evaporator and other than an outlet of the working fluid channel through which the working fluid flows out of the evaporator, and an output value of the temperature sensor is used to adjust the temperature of the working fluid in the evaporator.

According to the twenty-first aspect, the temperature sensor is provided in the part of the working fluid channel exposed to the outside of the housing of the evaporator in a region other than the inlet of the working fluid channel into which the working fluid flows from the outside of the evaporator and other than the outlet of the working fluid channel through which the working fluid flows out of the evaporator. The temperature of the working fluid within the heat exchanger can be thus known, facilitating adjustment of the temperature of the working fluid in the evaporator.

In a twenty-second aspect, for example, in the evaporator of the twenty-first aspect, the working fluid channel may be arranged to form a plurality of stages in the flow direction of the high-temperature fluid and may be arranged to form a meander shape in the plurality of stages. The part of the working fluid channel exposed to the outside of the housing of the evaporator may be a bent portion of the meander shape.

In a twenty-third aspect, for example, the plurality of stages of the evaporator according to the twenty-second aspect may include a first stage located most upstream in the flow direction of the high-temperature fluid, a third stage located most downstream in the flow direction of the high-temperature fluid, and a second stage between the first and third stages, and the working fluid channel allows the working fluid to flow from the outside of the evaporator into a part of the working fluid channel included in the first stage, to go through the third stage, and to flow out of the evaporator through a part of the working fluid channel included in the second stage. The temperature sensor is provided for a region of the working fluid channel where the working fluid moves from the third stage to the second stage.

According to the twenty-third aspect, the working fluid channel allows the working fluid to flow from the outside of the evaporator to the first stage, which is located most upstream in the flow direction of the high-temperature fluid among the plurality of stages. As previously described, in the evaporator, the high-temperature fluid increases in temperature upstream in the flow direction of the high-temperature fluid. Moreover, since the evaporator generates working fluid in the gas-phase state from working fluid partially in the liquid-phase state, the ratio of gas-phase working fluid in the working fluid channel therefore increases downstream in the flow direction of the working fluid. According to the twenty-third aspect, therefore, the stage including a part of the working fluid channel which is the least likely to increase in temperature is provided at the hottest place. It is therefore possible to prevent the temperature of the inner wall surface of the part of the working fluid channel forming the same stage from increasing to the decomposition temperature of the working fluid or higher.

In a twenty-fourth aspect, the evaporator according to the twenty-first aspect may further include a combustor which has a cylindrical shape and which generates high-temperature fluid and feeds the high-temperature fluid radially from the central axis of the cylindrical shape. The working fluid channel has a coil shape and is provided around the combustor.

According to the twenty-fourth aspect, the working fluid channel is provided around the combustor. In other words, the combustor is provided within the coil shape formed by the working fluid channel (in a region forming the central axis of the coil). Accordingly, the evaporator of the twenty-fourth aspect as a whole can be made smaller than the evaporators of the other aspects.

In a twenty-fifth aspect, in a cross-sectional view of the evaporator (when seen in the direction vertical to the central axis of the coil shape), the working fluid channel of the evaporator of the twenty-fourth aspect may include a first section (25a) which overlaps the evaporator and a second section (25b) which is located downstream of the first section in the flow direction of the working fluid and does not overlap the evaporator, and the temperature sensor may be provided between the first and second sections in the part of the working fluid channel exposed to the outside of the housing of the evaporator.

According to the twenty-fifth aspect, in the first section as a region close to the combustor, the working fluid channel is heated by the heat-temperature fluid at high temperature. Accordingly, from the viewpoint of preventing thermal decomposition of the working fluid, it is suitable that the working fluid is controlled so that in the first section, the working fluid changes to the gas-liquid two-phase state or low-temperature gas-phase state while the working fluid changes to the high-temperature gas-phase state in the second section which is distant from the combustor. According to the twenty-fifth aspect, the control can be easily performed by providing the temperature sensor between the first and second sections at the portion exposed to the outside of the housing of the evaporator.

In a twenty-sixth aspect, the evaporator according to the twenty-fourth or the twenty-fifth aspect may be a coil heat exchanger.

In a twenty-seventh aspect, the evaporator according to the twenty-fifth aspect may further include a structure which is provided between an inlet for receiving the high-temperature fluid and an outlet for discharging the high-temperature fluid and interrupts the flow of the high-temperature fluid to change the flow direction of the high-temperature fluid.

According to the twenty-seventh aspect, the flow direction of the high-temperature fluid can be determined so as to implement efficient heat exchange.

Hereinafter, a description is given of embodiments of the disclosure with reference to the drawings. The disclosure is not limited to the following embodiments.

Embodiment 1

Figure 1:
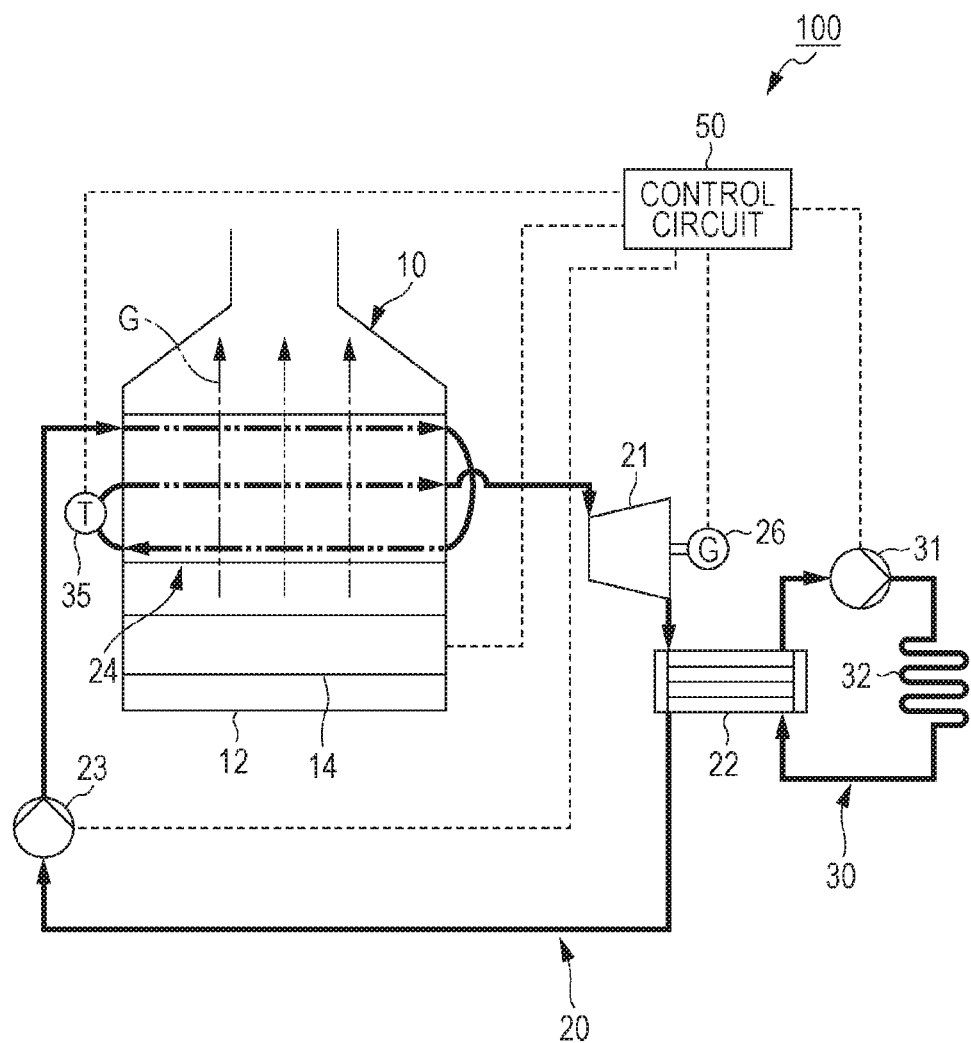
FIG. 1 is a configuration diagram of a CHP system according to Embodiment 1 of the disclosure.

As illustrated in FIG. 1, a combined heat and power system 100 (hereinafter referred to as a CHP system 100) of Embodiment 1 includes a boiler 10, a Rankine cycle apparatus 20, a heat medium circuit 30, and a control circuit 50. The CHP system 100 is capable of providing hot water and electrical power simultaneously or independently by using heat energy generated by the boiler 10. Here, the term "simultaneously" means that the CHP system 100 is capable of supplying hot water while supplying electric power.

The boiler 10 includes a combustion chamber 12 and a combustor 14. In upper part of the combustion chamber 12, an exhaust port is provided. The combustor 14 is a heat source to generate combustion gas G and is located within the combustion chamber 12. The combustion gas G generated in the combustor 14 moves upward in the internal space of the combustion chamber 12 and is discharged to the outside through the exhaust port. When the combustor 14, which generates the combustion gas G, is used as the heat source of the CHP system 100, high-temperature heat energy can be easily obtained. This can increase the power generation efficiency of the Rankine cycle apparatus 20. Within the boiler 10, another device such as a fan may be provided.

The boiler 10 is a gas boiler, for example. When the boiler 10 is a gas boiler, the combustor 14 is supplied with gas fuel, such as natural gas or biogas. The combustor 14 burns the gas fuel to generate the combustion gas G at high temperature. The boiler 10 may be another boiler such as a pellet boiler. In this case, the combustor 14 is supplied with solid fuel such as wood pellets.

The Rankine cycle apparatus 20 includes an expander 21, a condenser 22, a pump 23, and an evaporator 24. These components are connected into a ring in the aforementioned order with plural tubes so as to form a closed loop. The Rankine cycle apparatus 20 may include a publicly-known reproducer and the like.

The expander 21 expands the working fluid to convert the expansion energy of the working fluid to rotation power. The rotary shaft of the expander 21 is connected to a generator 26. The expander 21 drives the generator 26. The expander 21 is a positive displacement expander or a turboexpander, for example. The positive displacement expander is a scroll expander, a rotary expander, a screw expander, a reciprocating expander, or the like. The turboexpander is a so-called expansion turbine.

As the expander 21, a positive displacement expander is recommended. Generally, positive displacement expanders exert high expander efficiency in a wider range of rotation speed than that of turboexpanders. For example, the positive displacement expanders can operate at a rotation speed lower than half the rated speed while retaining the high efficiency. In other words, the power generation by the positive displacement expanders can be reduced to half the rated power generation amount or less with the efficiency maintained high. With the positive displacement expanders, which have such characteristics, it is possible to flexibly respond to changes in power generation due to changes in thermal demand. Moreover, it is possible to increase or reduce the power generation in response to varying electricity demand with the efficiency maintained high.

The condenser 22 causes water in the heat medium circuit 30 to exchange heat with the working fluid discharged from the expander 21, thus cooling the working fluid and heating the water. As the condenser 22, a publicly-known heat exchanger such as a plate-type heat exchanger or a double-pipe heat exchanger can be used. The type of the condenser 22 is properly selected depending on the type of the heat medium in the heat medium circuit 30. When the heat medium in the heat medium circuit 30 is liquid such as water, the condenser 22 can suitably employ a plate-type heat exchanger or a double-pipe heat exchanger. When the heat medium in the heat medium circuit 30 is gas such as air, the condenser 22 can suitably employ a fin tube heat exchanger.

The pump 23 sucks and pressurizes the working fluid flowing out from the condenser 22 and supplies the pressurized working fluid to the evaporator 24. The pump 23 can be a general positive displacement pump or turbopump. The general positive displacement pump is a piston pump, a gear pump, a vane pump, a rotary pump, or the like. The turbopump is a centrifugal pump, a mixed flow pump, an axial pump, or the like.

The evaporator 24 is a heat exchanger which absorbs heat energy of the combustion gas G generated by the boiler 10. The evaporator 24 is a fin tube heat exchanger, for example. The evaporator 24 is provided within the boiler 10 so as to be situated in the channel of the combustion gas G. In Embodiment 1, the evaporator 24 is located right above the combustor 14. In the evaporator 24, the combustion gas G generated in the boiler 10 exchanges heat with the working fluid of the Rankine cycle apparatus 20. The working fluid is thereby heated and evaporated.

As the working fluid of the Rankine cycle apparatus 20, organic working fluid can be preferably used. The organic working fluid is halogenated hydrocarbon, hydrocarbon, alcohol, or the like. The halogenated hydrocarbon is R-123, R-245fa, R-1234ze, or the like. The hydrocarbon is an alkane such as propane, butane, pentane, or isopentane. The alcohol is ethanol or the like. The working fluid may be composed of one or a mixture of two or more types of those organic working fluids. The working fluid can be inorganic working fluid such as water, carbon dioxide, or ammonium.

The heat medium circuit 30 is a circuit in which water (the heat medium) as a low-temperature heat source flows, the low-temperature heat source cooling the working fluid of the Rankine cycle apparatus 20 in the condenser 22. The heat medium circuit 30 is connected to the condenser 22. The water in the heat medium circuit 30 is heated by the working fluid discharged from the expander 21. The heat medium circuit 30 is provided with a pump 31 and a radiator 32. The radiator 32 is a part of a floor heating appliance in the room, for example. The hot water generated by the condenser 22 is supplied to the radiator 32 by the pump 31 to be used for room heating. In other words, the heat medium circuit 30 is a hot water heating circuit in Embodiment 1. In the case of heating city water in the condenser 22, the hot water generated by the condenser 22 can be used for hot water supply. The effective use of low-temperature waste heat of the working fluid can increase the total thermal efficiency of the Rankine cycle apparatus 20.

When the heat medium to be heated through the heat medium circuit 30 is liquid such as water or brine like Embodiment 1, the heat medium circuit 30 can be composed of plural tubes. On the other hand, when the heat medium to be heated through the heat medium circuit 30 is gas such as air, the heat medium circuit 30 can be composed of an air trunk or a duct for the gas to flow through. The hot air generated by the condenser 22 is supplied into the room to be used for room heating.

The hot water generated by the heat medium circuit 30 can be supplied to other facilities such as a shower, taps, and a hot-water tank. The heat medium circuit 30 may be configured to be used for re-heating low-temperature hot water or to be used to heat city water. The CHP system 100 may be configured to supply only electric power by suspending supply of hot water through the heat medium circuit 30.

The control circuit 50 controls control objects including the pumps 23 and 31, combustor 14, and generator 26. The control circuit 50 needs to have a control function and includes an arithmetic processing unit (not illustrated) and a storage (not illustrated) storing a control program. Examples of the arithmetic processing unit are a MPU and a CPU. The storage is a memory, for example. The control circuit 50 may be a single control circuit performing centralized control or may be composed of plural control circuits cooperating with each other for distributed control (the same applies for control circuits of the other embodiments and modifications). The control circuit 50 stores a program to appropriately operate the CHP system 100.

Next, the structure of the evaporator 24 is described in detail.

Figure 2B:
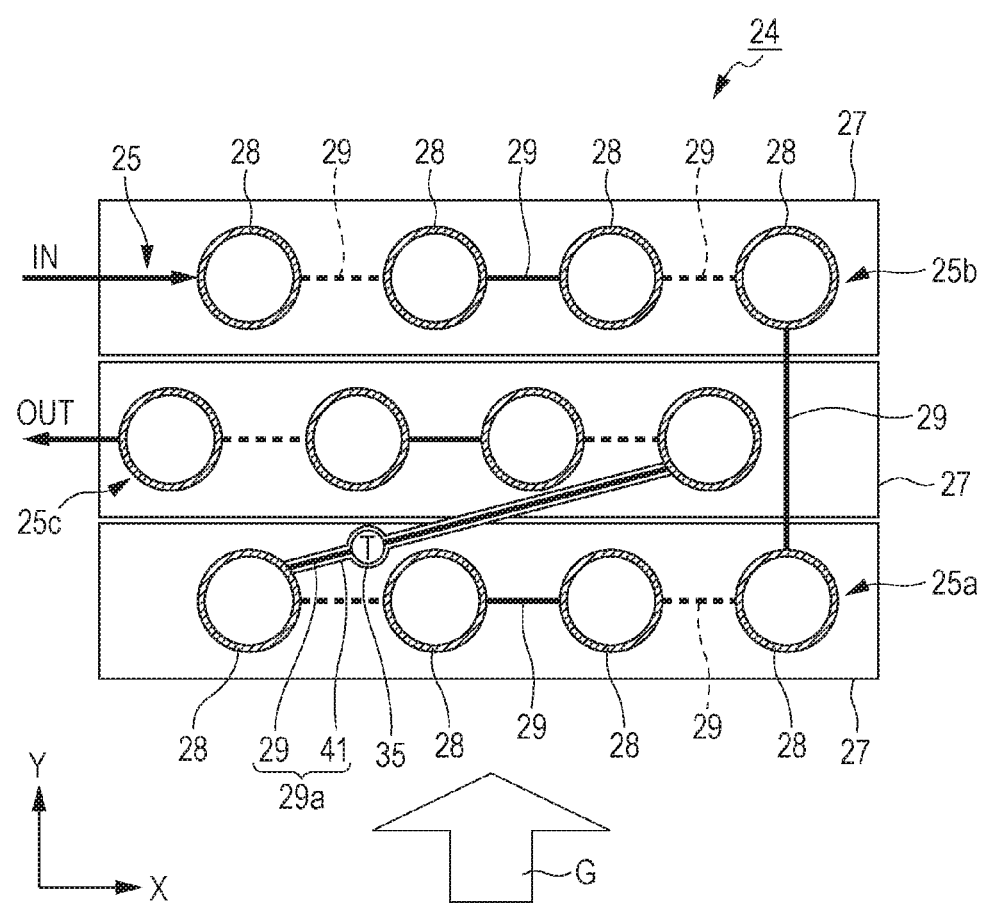
FIG. 2B is a schematic plan view of the evaporator illustrated in FIG. 2A.

As illustrated in FIGS. 2A and 2B, the evaporator 24 includes a working fluid channel 25 through which the working fluid flows. The working fluid channel 25 forms plural stages in the flow direction of the combustion gas G which exchanges heat with the working fluid. The working fluid channel 25 is provided with a temperature sensor 35. Based on output values (detected values) of the temperature sensor 35, the temperature of the working fluid in the evaporator 24 is adjusted.

In Embodiment 1, the evaporator 24 is a fin tube heat exchanger including plural fins 27, plural heat exchanger tubes 28, and plural connecting tubes 29. The plural fins 27 are arranged side by side in the horizontal direction so that the front and back surfaces thereof are positioned in parallel to the vertical direction. The spaces formed between the fins 27 adjacent to each other form an exhaust path of the combustion gas G. The plural heat exchanger tubes 28 are arranged in plural stages in the flow direction (height direction) of the combustion gas G which exchanges heat with the working fluid. In Embodiment 1, the plural heat exchanger tubes 28 are arranged in three stages in the height direction. The plural connecting tubes 29 connect the plural heat exchanger tubes 28 to each other. The connecting tubes 29 are so-called bend tubes.

The working fluid channel 25 is composed of the plural heat exchanger tubes 28 and the plural connecting tubes 29. The heat exchanger tubes 28 are located within the combustion chamber 12, and the connecting tubes 29 are located outside of the combustion chamber 12. The heat exchanger tubes 28 are situated in the flow path of the combustion gas G and exchange heat with combustion gas G. The connecting tubes 29 are located outside of the flow path of the combustion gas G and does not directly exchange heat with the combustion gas G.

Each stage includes plural heat exchanger tubes 28 (four tubes in Embodiment 1) arranged in the horizontal direction (a direction vertical to the flow direction of the combustion gas G). The heat exchanger tubes 28 are therefore arranged in the height direction (the direction Y) and the horizontal direction (the direction X) in a matrix. The working fluid flows through the plural heat exchanger tubes 28 located in the same stage and then fed to the heat exchanger tubes 28 located in another stage. As illustrated in FIG. 2B, when the evaporator 24 is observed in the direction vertical to the surfaces of the fins 27, the plural heat exchanger tubes 28 are provided in a staggered arrangement. The plural heat exchanger tubes 28 are connected to each other with the connecting tubes 29, which are provided at both ends of each heat exchanger tubes 28, so as to form a single flow channel. However, it is unnecessary to form a single channel with all of the heat exchanger tubes 28. The heat exchanger tubes 28 may be configured to form two or more flow channels by using publicly known components such as a divider. Moreover, the heat exchanger tubes 28 and connecting tubes 29 can be composed of so-called hairpin tubes. In this case, the combination of two of the linear heat exchanger tubes 28 and one of the connecting tubes 29 can be replaced with one hairpin tube.

The working fluid channel 25 includes a most-upstream working fluid channel 25a, a most-downstream working fluid channel 25b, and at least an intermediate working fluid channel 25c. The most-upstream working fluid channel 25a is a flow channel located in the most upstream stage in the flow direction of the combustion gas G. The most-downstream working fluid channel 25a is a channel located in the most downstream stage in the flow direction of the combustion gas G. The intermediate working fluid channel 25c is a flow channel located between the most-upstream and most-downstream working fluid channels 25a and 25b in the flow direction of the combustion gas G. The at least an intermediate working fluid channel 25c may include plural intermediate working fluid channels 25c. The most-upstream, most-downstream, and intermediate working fluid channels 25a, 25b, and 25c are each composed of plural heat exchanger tubes 28 and plural connecting tubes 29.

One of the heat exchanger tubes 28 constituting the most-downstream working fluid channel 25b serves as an inlet of the evaporator 24 so that the working fluid entering the evaporator 24 flows through the heat exchanger tubes 28 at first. One of the exchanger tubes 28 constituting the intermediate working fluid channel 25c serves as an outlet of the evaporator 24. The most-upstream working fluid channel 25a constitutes middle part of the working fluid channel 25. The working fluid discharged from the pump 23 flows through the most-downstream working fluid channel 25b, the most-upstream working fluid channel 25a, and the intermediate working fluid channel 25c in this order.

Just after being discharged from the pump 23 and flowing into the evaporator 24, the working fluid is in the liquid-phase state or gas-liquid two-phase state and has the lowest temperature in the evaporator 24. The working fluid flows in the evaporator 24 and is heated by the combustion gas G to be evaporated. At the outlet of the evaporator 24, the working fluid is in the gas-phase state and has the highest temperature in the evaporator 24. If excessive heat exchange between the working fluid and the combustion gas G occurs in the evaporator 24, an excessive increase in temperature of the working fluid could cause troubles including thermal decomposition of the working fluid, deterioration of lubricant oil, and the like.

In Embodiment 1, in terms of the flow direction of the working fluid, the temperature sensor 35 is provided downstream of a downstream end 25p of the most-upstream working fluid channel 25a in the working fluid channel 25.

Based on the output value of the temperature sensor 35, the temperature of the working fluid in the evaporator 24 is adjusted. To be specific, control is made so that the temperature of the working fluid at the position of the temperature sensor 35 is maintained at a temperature lower than a setting upper limit temperature. This can prevent the working fluid from being excessively heated. The reason thereof is as follows. The inner wall surface of the heat exchanger tube 28 located at the downstream end 25p of the most-upstream working fluid channel 25a has the highest temperature among the heat exchanger tubes 28. It is therefore possible to determine that the working fluid is prevented from being excessively heated when the working fluid has a temperature lower than a setting upper limit temperature at an arbitrary position downstream of the downstream end 25p.

In Embodiment 1, the temperature sensor 35 is attached to one of the connecting tubes 29 constituting the working fluid channel 25 downstream of the downstream end 25p of the most-upstream working fluid channel 25a in terms of the flow direction of the working fluid. Specifically, the temperature sensor 35 is attached to the connecting tube 29 connected to the downstream end 25p of the most-upstream working fluid channel 25a. When the temperature sensor 35 is provided at such a position, the aforementioned effect can be obtained.

The temperature sensor 35 is bonded to the outer circumferential surface of the connecting tube 29, for example. A sensing portion (a thermocouple, a thermistor, or the like) of the temperature sensor 35 may be inserted into the connecting tube 29. Moreover, the temperature sensor 35 is preferably provided at the position equidistant from each end of the connecting tube 29. By locating the temperature sensor 35 properly away from the heat exchanger tubes 28, the temperature sensor 35 can be prevented from being influenced by heat conduction. It is therefore possible to accurately detect the temperature of the working fluid flowing through the connecting tube 29.

In Embodiment 1, the thermal influence caused by an environment around the evaporator 24 on the temperature sensor 35 is controlled. Specifically, the evaporator 24 further includes a heat insulator 41 surrounding the temperature sensor 35. This heat insulator 41 controls the thermal influence caused by an environment around the evaporator 24 on the temperature sensor 35. The heat insulator 41 surrounds the temperature sensor 35 and connecting tube 29 to which the temperature sensor 35 is attached. The connecting tube 29 and heat insulator 41 constitute a thermally-insulated connecting tube 29a. With such a configuration, the temperature of the working fluid flowing through the connecting tube 29 is detected accurately. The heat insulator 41 is made of woven fabric, non-woven fabric, felt, rock wool, glass wool, silicone sponge, or the like.

In Embodiment 1, the most-upstream working fluid channel 25a is composed of at least an inner grooved pipe. To be specific, at least one of the heat exchanger tubes 28 constituting the most-upstream working fluid channel 25a is composed of an inner grooved pipe. Every heat exchanger tube 28 constituting the most-upstream working fluid channel 25a may be an inner grooved pipe. The plural connecting tubes 29 constituting the most-upstream working fluid channel 25a may be either inner grooved pipes or inner smooth pipes. The inner grooved pipes are heat exchanger tubes on the grounds that the working fluid such as a coolant is in the gas-liquid two-phase state and the tubes are applied to the evaporator. When the heat exchanger tubes 28 have grooves in the inner circumferential surfaces, the working fluid in the liquid-phase state flows along the grooves to form swirling flow.

In the most-upstream working fluid channel 25a, because of the frame radiation, each heat exchanger tube 28 receives a relatively large amount of heat in a particular section (a section facing the frame) of the surface thereof and receives a relatively small amount of heat in the other section. Accordingly, there is a risk that the temperature of the heat exchanger tube 28 will increase locally. However, when the heat exchanger tube 28 is an inner grooved pipe, the working fluid swirls within the heat exchanger tube 28. The generation of swirling flow can prevent the temperature of the working fluid from locally increasing within the heat exchanger tube 28, reducing the local difference in temperature. According to Embodiment 1, it is therefore possible to reduce the influence of local changes in temperature in the most-upstream working fluid channel 25a and accurately detect the temperature of the working fluid with the temperature sensor 35.

A part or all of the working fluid channel 25 can be inner grooved pipes in the region downstream of the upstream end 25q of the most-upstream working fluid channel 25a. The connecting tube 29 connecting the most-upstream working fluid channel 25a and intermediate working fluid channel 25c may be an inner grooved pipe, for example. In this case, the measurement error of the temperature sensor can be reduced. Moreover, the plural heat exchanger tubes 28 and plural connecting tubes 29 constituting the intermediate working fluid channel 25c may be inner grooved pipes. The plural heat exchanger tubes 28 and plural connecting tubes 29 constituting the most-downstream working fluid channel 25b may be inner smooth pipes.

Figure 3:
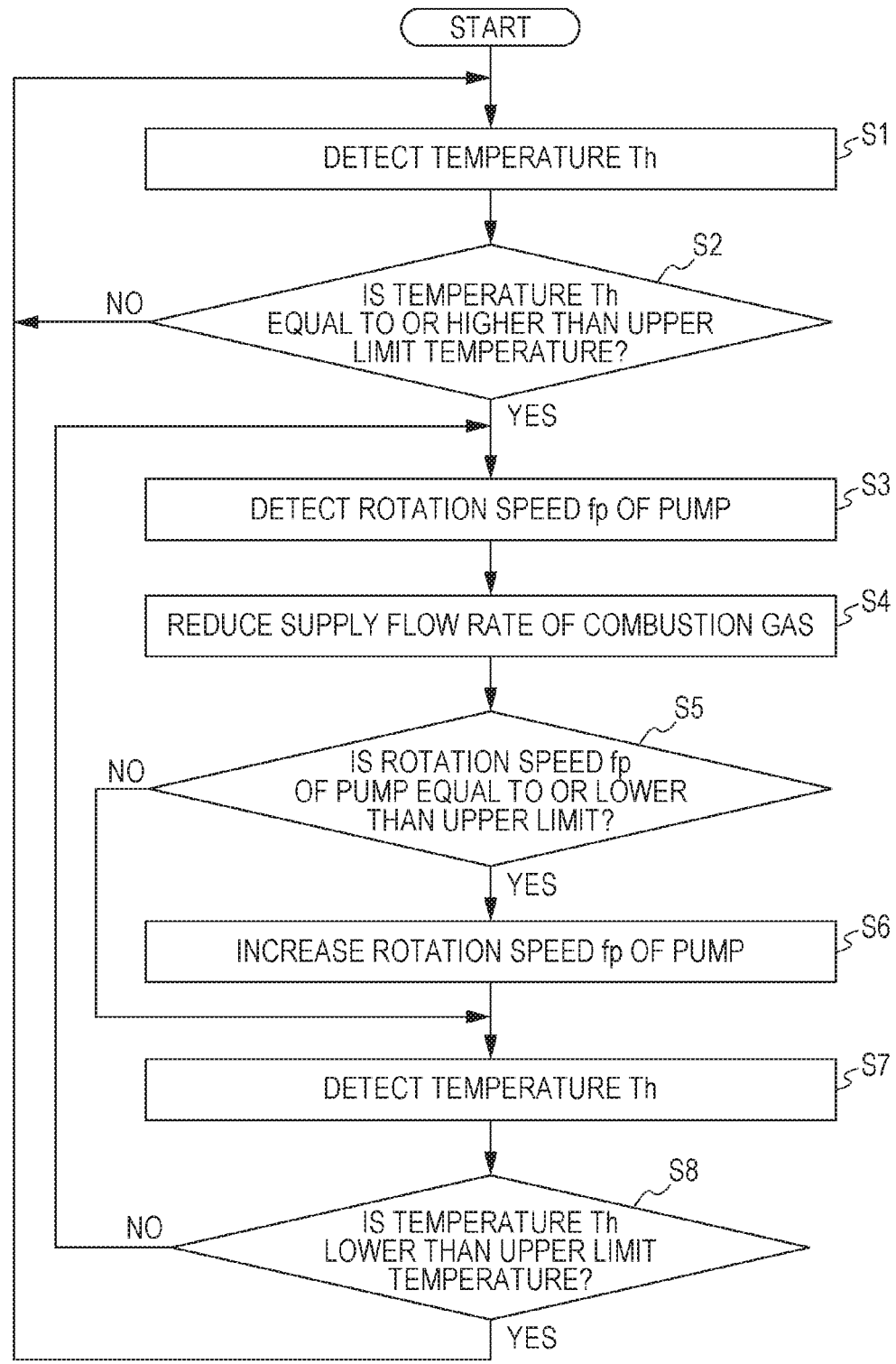
FIG. 3 is a flowchart of a control executed by a control circuit.

Next, with reference to the flowchart of FIG. 3, a description is given of a control which is executed by the control circuit 50 to adjust the temperature of the working fluid in the evaporator 24. By executing the control illustrated in FIG. 3, the temperature of the working fluid at a particular position of the evaporator 24 approximates to the target temperature. The aforementioned particular position is the position where the temperature sensor 35 is provided, for example. The control shown in the flowchart of FIG. 3 is started at the same time when the Rankine cycle apparatus 20 is activated, for example.

First, temperature Th of the working fluid is detected with the temperature sensor 35 (step S1). Next, based on the detected temperature Th, it is determined whether the temperature of the working fluid in the evaporator 24 is excessively high (step S2). Specifically, it is determined whether the detected temperature Th is equal to or higher than the upper limit temperature previously set. When the temperature of the working fluid is excessively high, a process to reduce the temperature of the working fluid is executed. Before execution of the process to reduce the temperature of the working fluid, the rotation speed fp (operation frequency) of the pump 23 is detected (step S3).

Next, the temperature of the working fluid is reduced by reducing the supply flow rate of the combustion gas G to the evaporator 24. In other words, the combustor 14 is controlled to reduce the amount of the combustion gas G generated per unit time (an amount of combustion heat generated per unit time) (step S4). The way of reducing the supply flow rate of the combustion gas G includes reducing fuel supply to the combustor 14 (the amount of fuel supplied per unit time). When a fan to feed air into the boiler 10 is provided, the supply flow rate of the combustion gas G can be reduced by reducing the air flow from the fan. The temperature of the working fluid in the evaporator 24 can be thus adjusted by controlling the supply flow rate of the combustion gas G.

Next, it is determined whether the rotation speed fp of the pump 23 is equal to or lower than the upper limit (step S5). When the rotation speed fp of the pump 23 is equal to or lower than the upper limit, the rotation speed fp of the pump 23 is increased (step S6). The circulation flow rate of the working fluid in the Rankine cycle apparatus 20 thereby increases. When the rotation speed fp of the pump 23 is increased, the flow rate of the working fluid in the evaporator 24 increases, and the temperature of the working fluid can decrease. Accordingly, by controlling the rotation speed of the pump 23, the temperature of the working fluid in the evaporator can be adjusted. After the rotation speed fp of the pump 23 is increased, the temperature Th of the working fluid is detected with the temperature sensor 35 (step S7). It is then determined whether the detected temperature Th is lower than the upper limit temperature (step S8). The processes of the steps S3 to S8 are repeated until the temperature Th of the working fluid becomes lower than the upper limit temperature.

Figure 4:
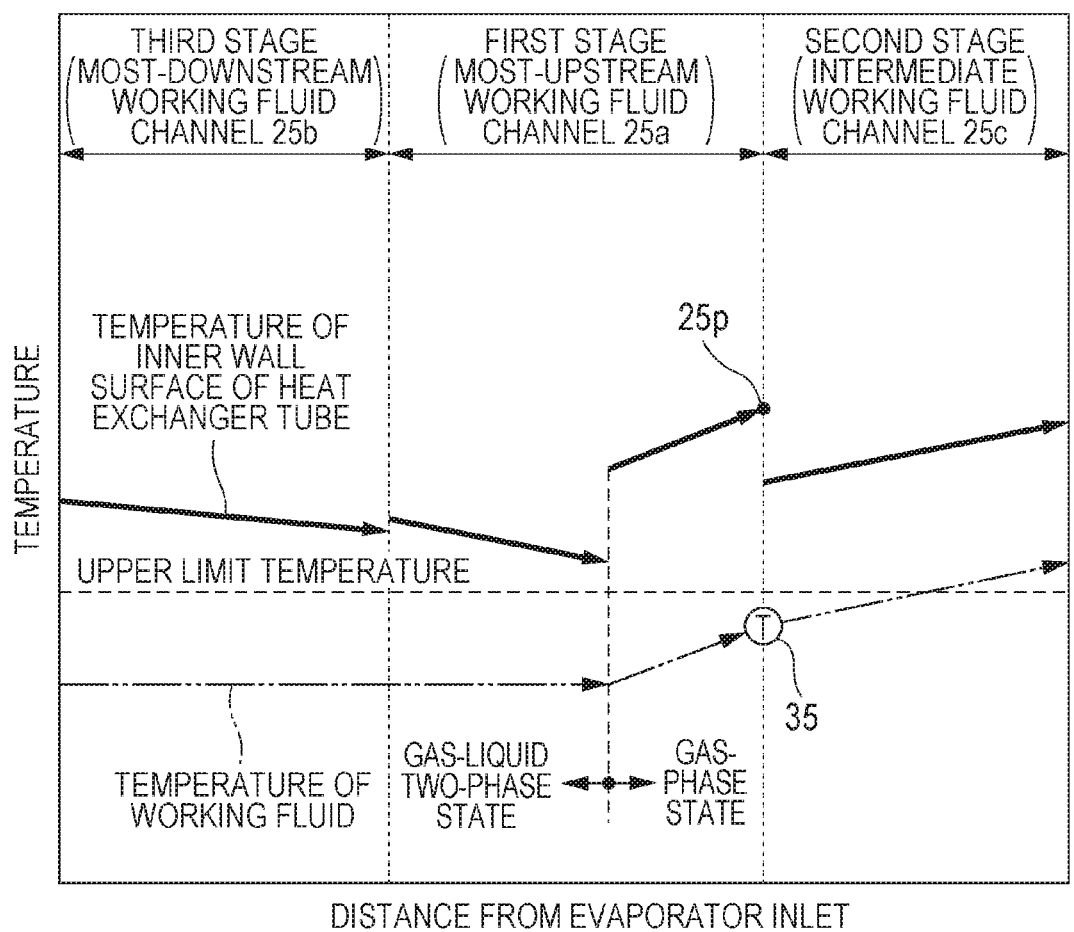
FIG. 4 is a diagram showing a relationship between the temperature of working fluid and the temperature of inner wall surfaces of heat exchanger tubes in the evaporator.

FIG. 4 illustrates a relationship between the temperature of the working fluid in the evaporator 24 and the temperature of the inner wall surfaces of the heat exchanger tubes. The horizontal axis of FIG. 4 shows the distance from the inlet of the evaporator 24. The vertical axis of FIG. 4 shows temperature. In the example shown in FIG. 4, the Rankine cycle apparatus 20 is provided with a reheat unit, and the working fluid is in the gas-liquid two-phase state at the inlet of the evaporator 24.

The working fluid is heated by the combustion gas G to change to the gas-phase state between the inlet and outlet of the evaporator 24. The working fluid is in the gas-phase state when flowing out of the evaporator 24. The temperature of the working fluid is constant when the working fluid is in the gas-liquid two-phase state and increases after the working fluid changes to the gas-phase state. The temperature of the inner wall surfaces of the heat exchanger tubes 28 never increases rapidly as long as the working fluid is in the gas-liquid two-phase state. Accordingly, the temperature of the working fluid is less likely to excessively increase in the most-upstream working fluid channel 25a. When the working fluid is in the gas-liquid two-phase state, the inner wall surfaces of the heat exchanger tubes 28 have a high enough heat transfer coefficient. Accordingly, heat transfer to the working fluid can prevent an increase in temperature of the inner wall surfaces.

When the working fluid changes from the gas-liquid two-phase state to the gas-phase state, the temperature of the inner wall surfaces of the heat exchanger tubes 28 rapidly increases. When the working fluid is in the gas-phase state in the heat exchanger tubes 28, the inner wall surface of each heat exchanger tube 28 has a low heat transfer coefficient and therefore increases in temperature. When the working fluid moves from one stage to another in the evaporator 24, the temperature of the inner wall surfaces of the heat exchanger tubes 28 to which the working fluid is exposed changes because of a change in temperature of the combustion gas G. The temperature of the combustion gas G is relatively high in the upstream (the first stage) and is relatively low in the downstream (the second stage). When the working fluid moves from the first stage to the second stage, the temperature of the inner surfaces of the heat exchanger tubes 28 to which the working fluid is exposed decreases. When the working fluid is in the gas-phase state, the temperature of the inner wall surfaces of the heat exchanger tubes 28 continues increasing along with an increase in temperature of the working fluid. Accordingly, the temperature of the working fluid is the highest at the outlet of the evaporator 24. Accordingly, the outlet of the evaporator 24 is preferably provided at the downstream portion in the flow direction of the combustion gas G.

When the outlet of the evaporator 24 is provided at the downstream portion in the flow direction of the combustion gas G, the inner wall surface of the heat exchanger tube 28 located at the downstream end 25p of the most-upstream working fluid channel 25a has the highest temperature among the heat exchanger tubes 28 constituting the working fluid channel 25. In other words, the working fluid is most likely to be thermally decomposed at the downstream end 25p. Accordingly, it is significant from the viewpoint of safety to know the temperature of the heat exchanger tube 28 constituting the downstream end 25p of the most-upstream working fluid channel 25a and control the Rankine cycle apparatus 20 so that the temperature of the working fluid is lower than the decomposition temperature.

In the example shown in FIG. 4, the working fluid changes from the gas-liquid two-phase state to the gas-phase state in the most-upstream working fluid channel 25a. From the viewpoint of safety, it is desirable that the working fluid is in the gas-liquid two-phase state all through the most-upstream working fluid channel 25a. However, the operation conditions of the Rankine cycle apparatus 20 vary from season to season or the like. When the working fluid is in the gas-liquid two-phase state all through the most-upstream working fluid channel 25a, therefore, there is a possibility that the working fluid in the gas-phase state at a target temperature cannot be supplied to the expander 21 in a particular operation condition. Accordingly, it is not always inhibited that the working fluid changes from the gas-liquid two-phase state to the gas-phase state in the most-upstream working fluid channel 25a. If the temperature of the working fluid is lower than the upper limit temperature at the position where the temperature sensor 35 is provided, the safety is ensured.

The technique disclosed in the specification is effective especially when the working fluid is an organic working fluid. To be more specific, the technique disclosed in the specification is effective especially when the temperature of the combustion gas G is higher than the decomposition temperature of the working fluid. If organic working fluid is employed, the Rankine cycle apparatus can be configured by using a comparatively low temperature heat source as well as a high temperature heat source, such as the boiler 10. The higher the temperature of the combustion gas G, the higher the operation efficiency of the Rankine cycle apparatus 20. In an example, the highest temperature of combustion gas generated by a gas boiler is 1500° C., and the composition temperature of the organic working fluid is in a range of 150 to 300° C.

(Modification)

As illustrated in FIG. 2C, the temperature sensor 35 may be provided in the most-upstream working fluid channel 25a. In the modification, the temperature sensor 35 is located in a range of L/2 upstream in the flow direction of the working fluid from the downstream end 25p of the most-upstream working fluid channel 25a. Herein, L is defined as the whole length of the most-upstream working fluid channel 25a. Specifically, the temperature sensor 35 is attached to the connecting tube 29 constituting the most-upstream working fluid channel 25a in the aforementioned range. It is possible to estimate the temperature of the working fluid or the inner surface of the heat exchanger tube 28 at the downstream end 25p of the most-upstream working fluid channel 25a based on the temperature detected at a position comparatively close to the downstream end 25p of the most-upstream working fluid channel 25a. Accordingly, even when the temperature sensor 35 is provided at the position illustrated in FIG. 2C, the control to adjust the temperature of the working fluid in the evaporator 24 can be executed in a similar manner to the case where the temperature sensor 35 is provided at the position illustrated in FIG. 2B. The longer the distance between the downstream end 25p and the temperature sensor 35, the higher the estimation uncertainty of the temperature of the working fluid or the temperature of the inner surface of the heat exchanger tube 28 at the downstream end 25p. Accordingly, the distance between the downstream end 25p and the temperature sensor 35 is preferably L/2 at the maximum as shown in the modification.

Hereinafter, a description is given of other embodiments of the CHP system. The same components of the other embodiments as those of Embodiment 1 are given the same reference numerals, and the description thereof is omitted. Accordingly, the description of each embodiment is applicable to the other embodiment as long as being technically consistent with each other.

Embodiment 2

Figure 5:
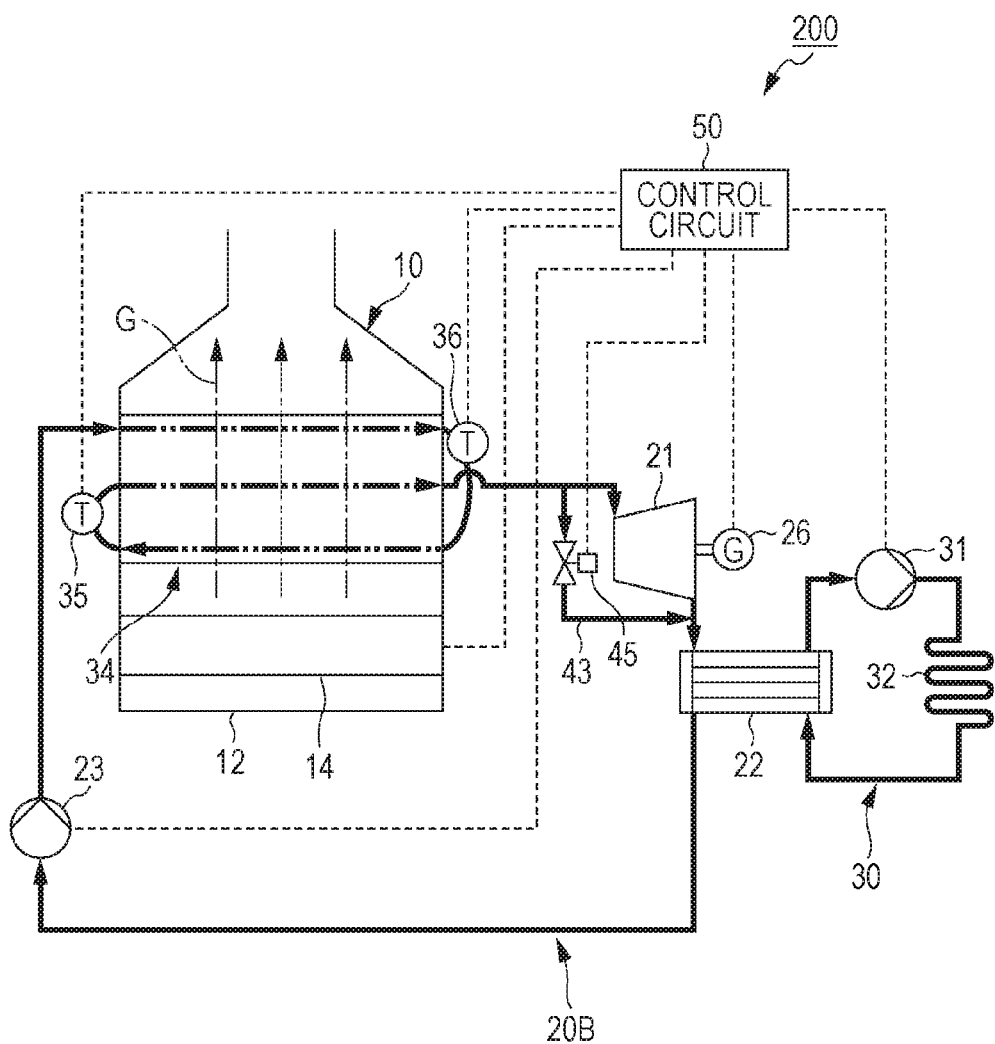
FIG. 5 is a configuration diagram of a CHP system according to Embodiment 2 of the disclosure.

As illustrated in FIG. 5, a CHP system 200 of Embodiment 2 includes the boiler 10, a Rankine cycle apparatus 20B, the heat medium circuit 30, and the control circuit 50. The configuration of the CHP system 200 of Embodiment 2 is the same as that of the CHP system 100 of Embodiment 1 except an evaporator 34 and a bypass circuit 43.

In the Rankine cycle apparatus 20B, the bypass circuit 43 is a circuit bypassing the expander 21. The bypass circuit 43 branches from the flow channel connecting the outlet of the evaporator 34 and the inlet of the expander 21 and joins the flow channel connecting the outlet of the expander 21 and the inlet of the condenser 22 (or the inlet of the reheat unit). The bypass circuit 43 is provided with a flow-rate control valve 45. The opening of the flow-rate control valve 45 is controlled to adjust the circulation flow rate of the working fluid in the Rankine cycle apparatus 20B.

Figure 6A:
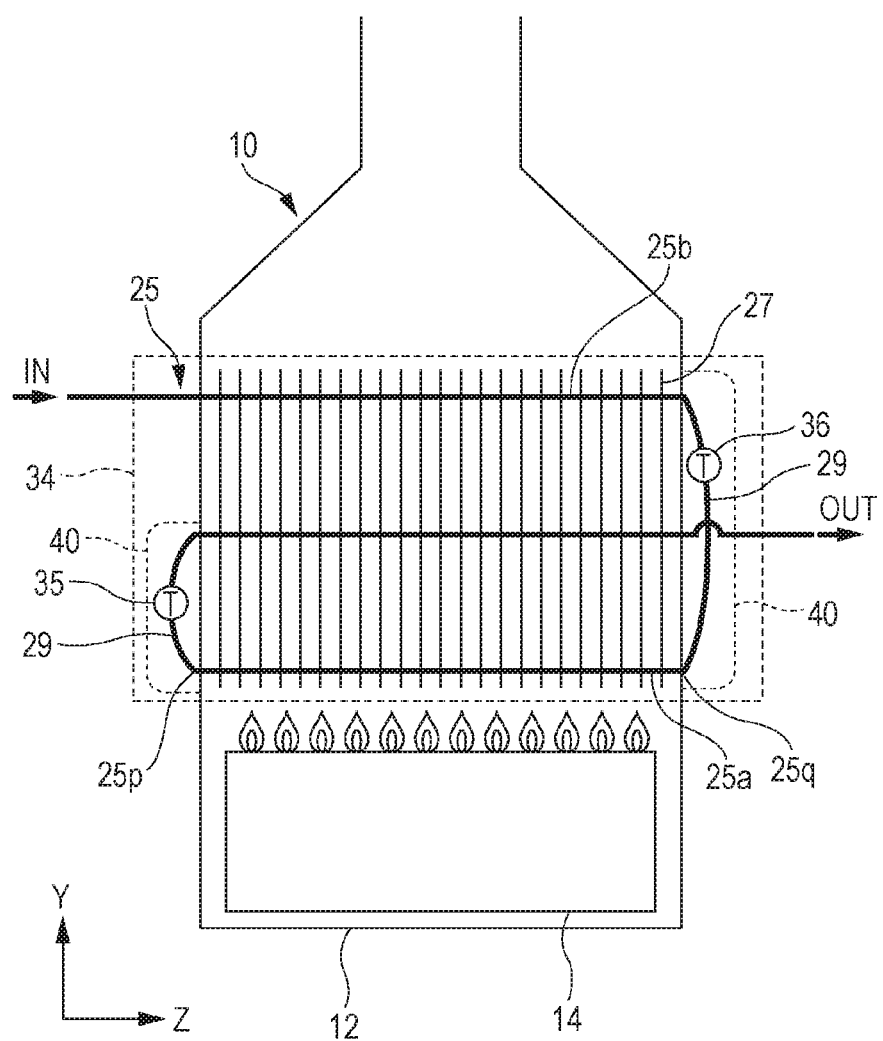
FIG. 6A is a configuration diagram of an evaporator of a Rankine cycle apparatus illustrated in FIG. 5.
Figure 6B:
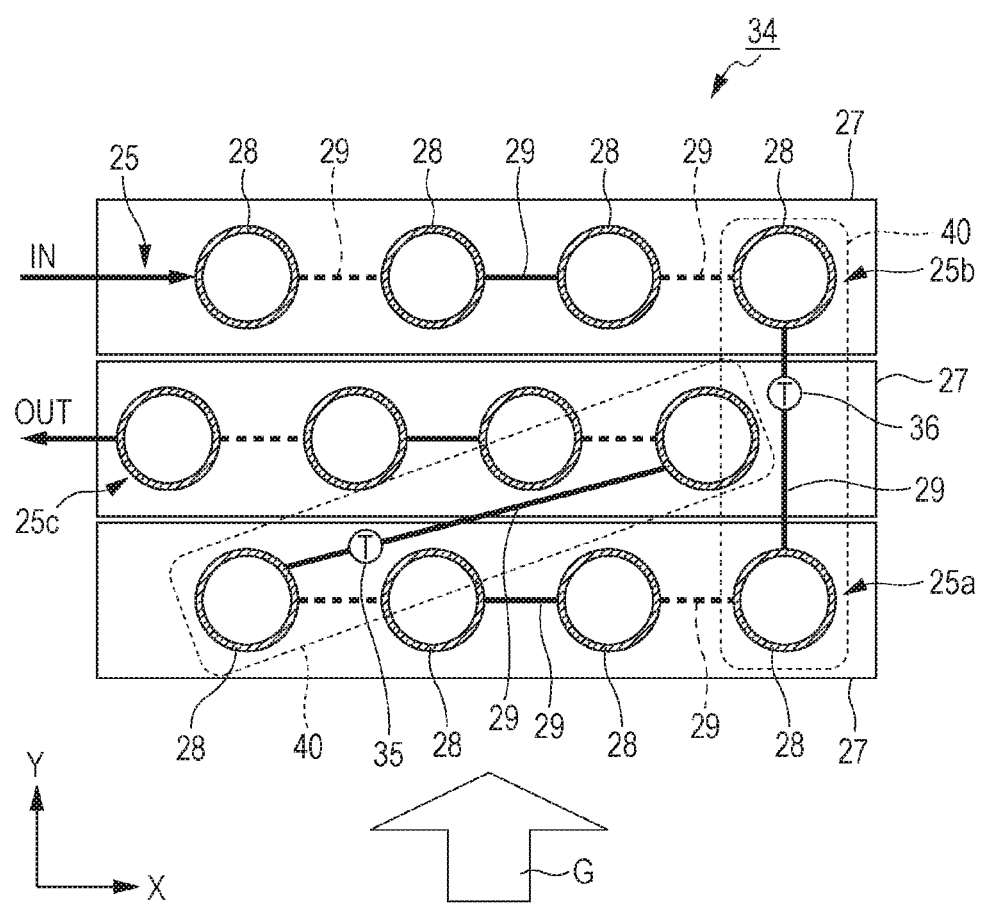
FIG. 6B is a schematic plan view of the evaporator illustrated in FIG. 6A.

As illustrated in FIGS. 6A and 6B, the evaporator 34 includes a first temperature sensor 35 and a second temperature sensor 36. The first temperature sensor 35 is attached to the connecting tube 29 connected to the downstream end 25p of the most-upstream working fluid channel 25a as described in Embodiment 1. In terms of the flow direction of the working fluid, the second temperature sensor 36 is provided upstream of the upstream end 25q of the most-upstream working fluid channel 25a in the working fluid channel 25. Specifically, the second temperature sensor 36 is attached to the connecting tube 29 connected to the upstream end 25q of the most-upstream working fluid channel 25a. The first and second temperature sensors 35 and 36 are both located outside of the combustion chamber 12. Based on the output values of the first and second temperature sensors 35 and 36, the temperature of the working fluid in the evaporator 34 is adjusted. This can prevent the working fluid from being excessively heated in the evaporator 34. Using the two temperature sensors 35 and 36 enables more accurate temperature control. The first and second temperature sensors 35 and 36 are provided for two connecting tubes 29 adjacent to the downstream and upstream ends 25p and 25q of the most-upstream working fluid channel 25a in particular. In this case, based on the difference (Th1−Th2) between temperature Th1 detected by the first temperature sensor 35 and temperature Th2 detected by the second temperature sensor 36, the state of the working fluid in the working fluid channel 25 (the most-upstream working fluid channel 25a in particular) can be accurately known. The difference (Th1−Th2) represents the degree of excessive heating of the working fluid. When the difference (Th1−Th2) is equal to zero, the working fluid is in the gas-liquid two-phase state all through the most-upstream working fluid channel 25a. When the difference (Th1−Th2) is larger than zero, the working fluid is in the gas-phase state at the downstream end 25p of the most-upstream working fluid channel 25a.

The evaporator 34 includes partitions 40. One of the partitions 40 is provided between the first temperature sensor 35 and the environment around the evaporator 34. Specifically, the partition 40 surrounds the first temperature sensor 35 and the connecting tube 29 to which the first temperature sensor 35 is attached. The partition 40 is a cover made of a resin plate, a metal plate, or the like, for example. The partition 40 reduces thermal influence of the environment around the evaporator 34 on the first temperature sensor 35. The other partition 40 is the same as the aforementioned partition 40 and is provided between the second temperature sensor 36 and the environment around the evaporator 34. With such a configuration, the temperature of the working fluid flowing through the connecting tube 29 can be accurately detected.

Next, with reference to the flowchart of FIG. 7, a description is given of a control which is executed by the control circuit 50 to adjust the temperature of the working fluid in the evaporator 34. By executing the control illustrated in FIG. 7, the temperature of the working fluid at a particular position of the evaporator 34 approximates to the target temperature. The particular position is the position where the first temperature sensor 35 is provided, for example.

First, temperatures Th1 and Th2 of the working fluid are detected with the first and second temperature sensors 35 and 36, respectively (step S11). Next, based on the two detected temperatures, it is determined whether the temperature of the working fluid in the evaporator 34 is excessively high (step S12). Specifically, it is determined whether the difference (Th1−Th2) between the two detected temperatures is equal to or less than threshold temperature previously set. When the difference (Th1−Th2) is more than the threshold temperature, the process to reduce the temperature of the working fluid is executed. Before execution of the process to reduce the temperature of the working fluid, the rotation speed fp (operation frequency) of the expander 21 is detected (step S13). The threshold temperature is in a range of 5 to 30° C., for example.

Next, the temperature of the working fluid is reduced by increasing the circulation flow rate of the working fluid. Specifically, the opening of a flow rate valve 45 is increased (step S14). When the opening of the flow rate valve 45 is increased, the circulation flow rate of the working fluid in the Rankine cycle apparatus 20b is increased. When the circulation flow rate of the working fluid is increased, the temperature of the working fluid decreases in the evaporator 34. By controlling the opening of the flow-rate control valve 45, the temperature of the working fluid in the evaporator 34 can be adjusted.

Next, it is determined whether the rotation speed fp of the expander 21 is equal to or less than an upper limit (step S15). When the rotation speed fp of the expander 21 is equal to or less than the upper limit, the rotation speed fp of the expander 21 is increased (step S16). When the rotation speed fp of the expander 21 is increased, the circulation flow rate of the working fluid in the evaporator 34 increases, and the temperature of the working fluid decreases. By controlling the rotation speed fp of the expander 21, therefore, the temperature of the working fluid can be adjusted in the evaporator 34. After the rotation speed fp of the expander 21 is increased, the temperatures Th1 and Th2 of the working fluid are detected with the first and second temperature sensors 35 and 36, respectively (step S17). It is then determined whether the difference (Th1−Th2) between the two detected temperatures is equal to or less than the threshold temperature (step S18). The processes of the steps S13 to S18 are repeated until the difference (Th1−Th2) becomes equal to or less than the threshold temperature.

The flow-rate control valve 45 may be an on-off valve which is controlled to only open and close states.

FIG. 8 is the same diagram as FIG. 4, illustrating a relationship between the temperature of the working fluid in the evaporator 34 and the temperature of the inner wall surfaces of the heat exchanger tubes. In Embodiment 2, the second temperature sensor 36 is attached to the connecting tube 29 adjacent to the upstream end 25q of the most-upstream working fluid channel 25a. At this position, the working fluid is in the gas-liquid two-phase state. By using the first and second temperature sensors 35 and 36, it is possible to know the states of the working fluid including the degree of excessive heating of the working fluid, pressure of the working fluid, and the like. It is therefore possible to make control after understanding the states of the working fluid in detail.

As the number of temperature sensors increases, changes in temperature of the working fluid in the evaporator 34 can be understood more accurately. However, increasing the number of temperature sensors means increasing the cost. Changes in the temperature of the working fluid in the evaporator 34 can be predicted with the two temperature sensors 35 and 36 as described in Embodiment 2. If the number of temperature sensors is limited, it is possible to implementing safety control while preventing an increase in cost. With regard to the temperature of the working fluid, the control to adjust the temperature of the working fluid in the evaporator 34 may be executed by using not only the temperature of the working fluid in the evaporator 34 but also the detected value of a temperature sensor provided at another place in the Rankine cycle apparatus 20B. Moreover, the control may be executed by using pressure detected by a pressure sensor.

Embodiment 3

Figure 9:
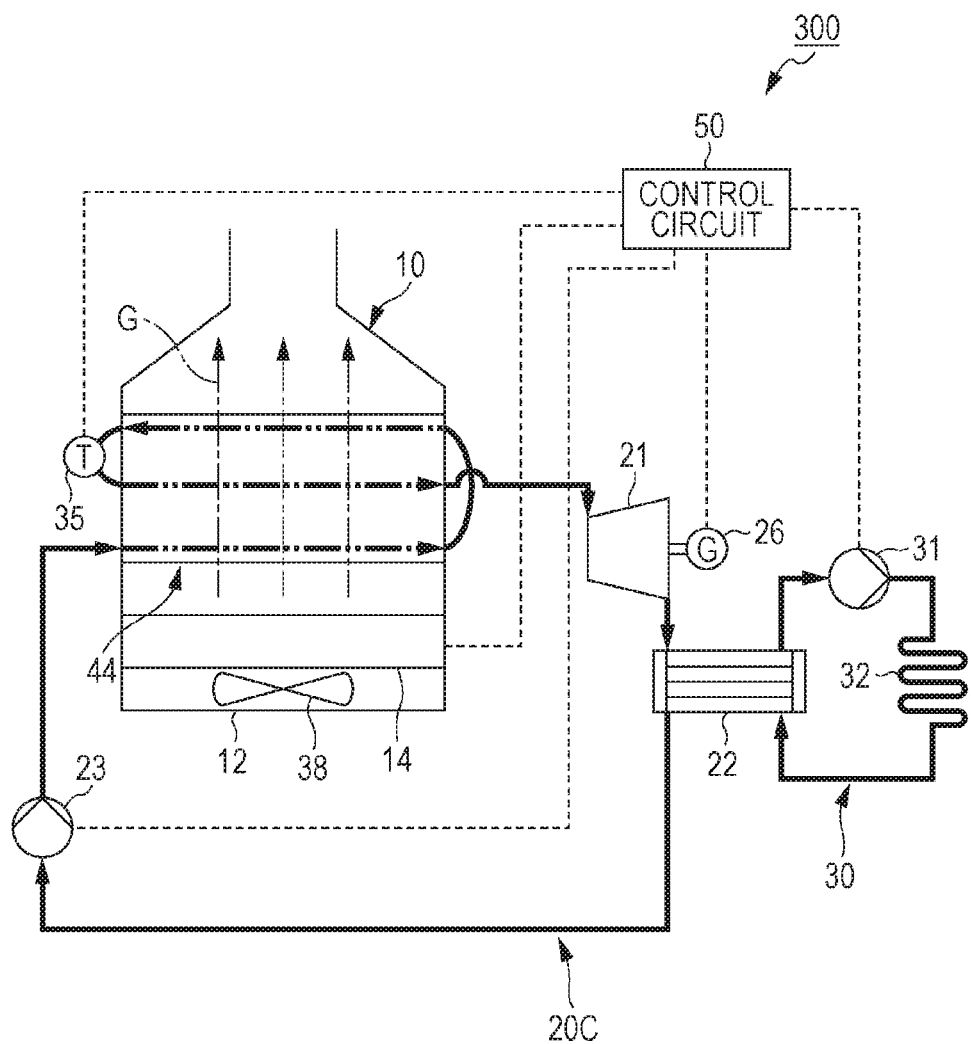
FIG. 9 is a configuration diagram of a CHP system according to Embodiment 3 of the disclosure.

As illustrated in FIG. 9, a CHP system 300 of Embodiment 3 includes the boiler 10, a Rankine cycle apparatus 20C, the heat medium circuit 30, and the control circuit 50. The configuration of the CHP system 300 of Embodiment 3 is the same as that of the CHP system 100 of Embodiment 1 except an evaporator 44 and an intake-air control fan 38 of the Rankine cycle apparatus 20C.

The intake-air control fan 38 is provided within the boiler 10. Specifically, the intake-air control fan 38 is provided in the flow path for supplying air to the combustor 14. The intake-air control fan 38 plays a role of controlling the flow rate of air to be supplied to the combustor 14.

Figure 10A:
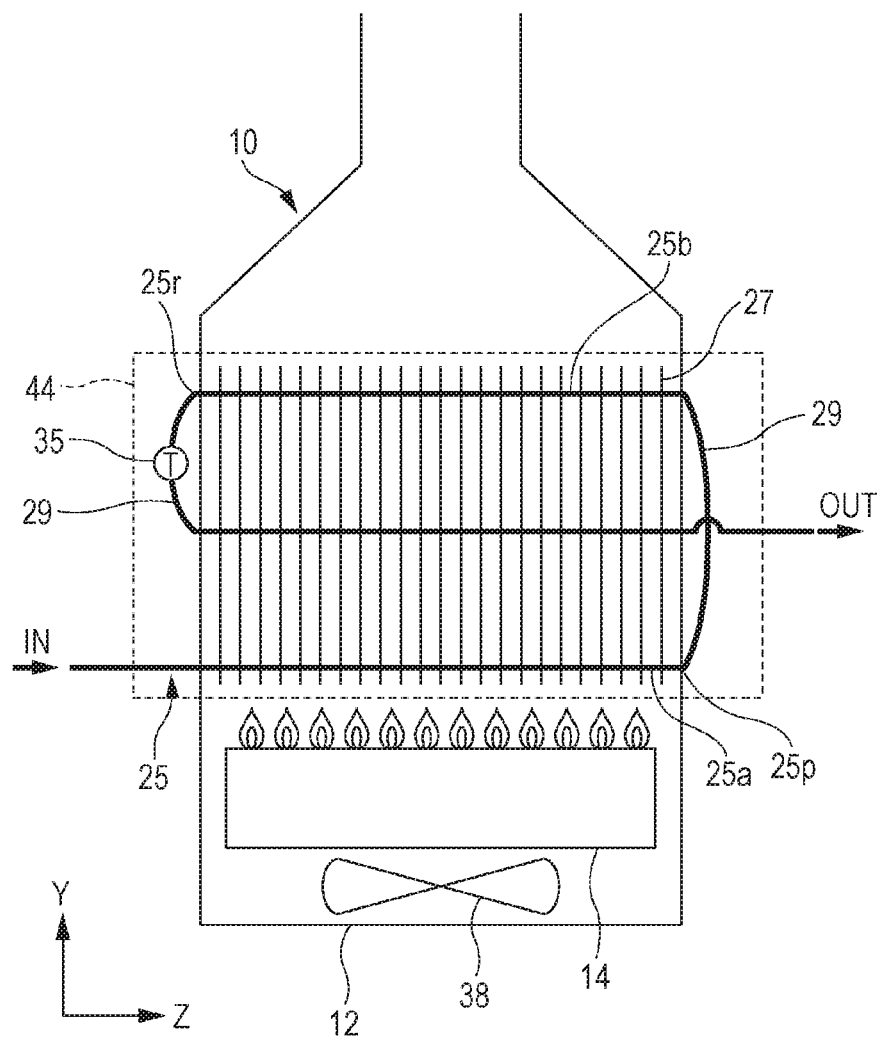
FIG. 10A is a configuration diagram of an evaporator of a Rankine cycle apparatus illustrated in FIG. 9.
Figure 10B:
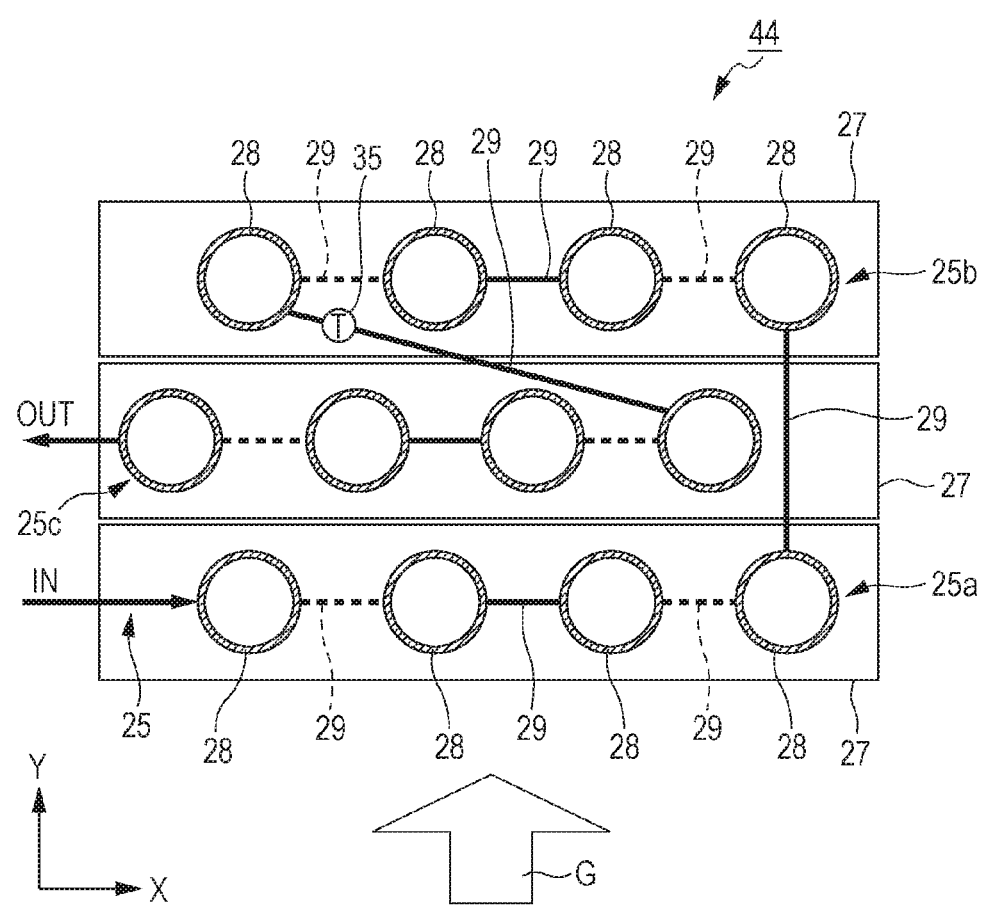
FIG. 10B is a schematic plan view of the evaporator illustrated in FIG. 10A.

As illustrated in FIGS. 10A and 10B, in Embodiment 3, one of the heat exchanger tubes 28 constituting the most-upstream working fluid channel 25a serves as the inlet of the evaporator 44 so that the working fluid entering the evaporator 44 first flows through the heat exchanger tubes 28 constituting the most-upstream working fluid channel 25a. The outlet of the evaporator 44 is composed of one of the heat exchanger tubes 28 constituting the intermediate working fluid channel 25c. The working fluid flows thorough the most-upstream working fluid channel 25a, the most-downstream working fluid channel 25b, and the intermediate working fluid channel 25c in this order.

The temperature sensor 35 is provided downstream of a downstream end 25r of the most-downstream working fluid channel 25b in the flow direction of the working fluid in the working fluid channel 25. Specifically, the temperature sensor 35 is attached to the connecting tube 29 connected to the downstream end 25r of the most-downstream working fluid channel 25b. When the temperature sensor 35 is located at such a position, the temperature of the working fluid at the downstream end 25r of the most-downstream working fluid channel 25b can be detected accurately.

Figure 11:
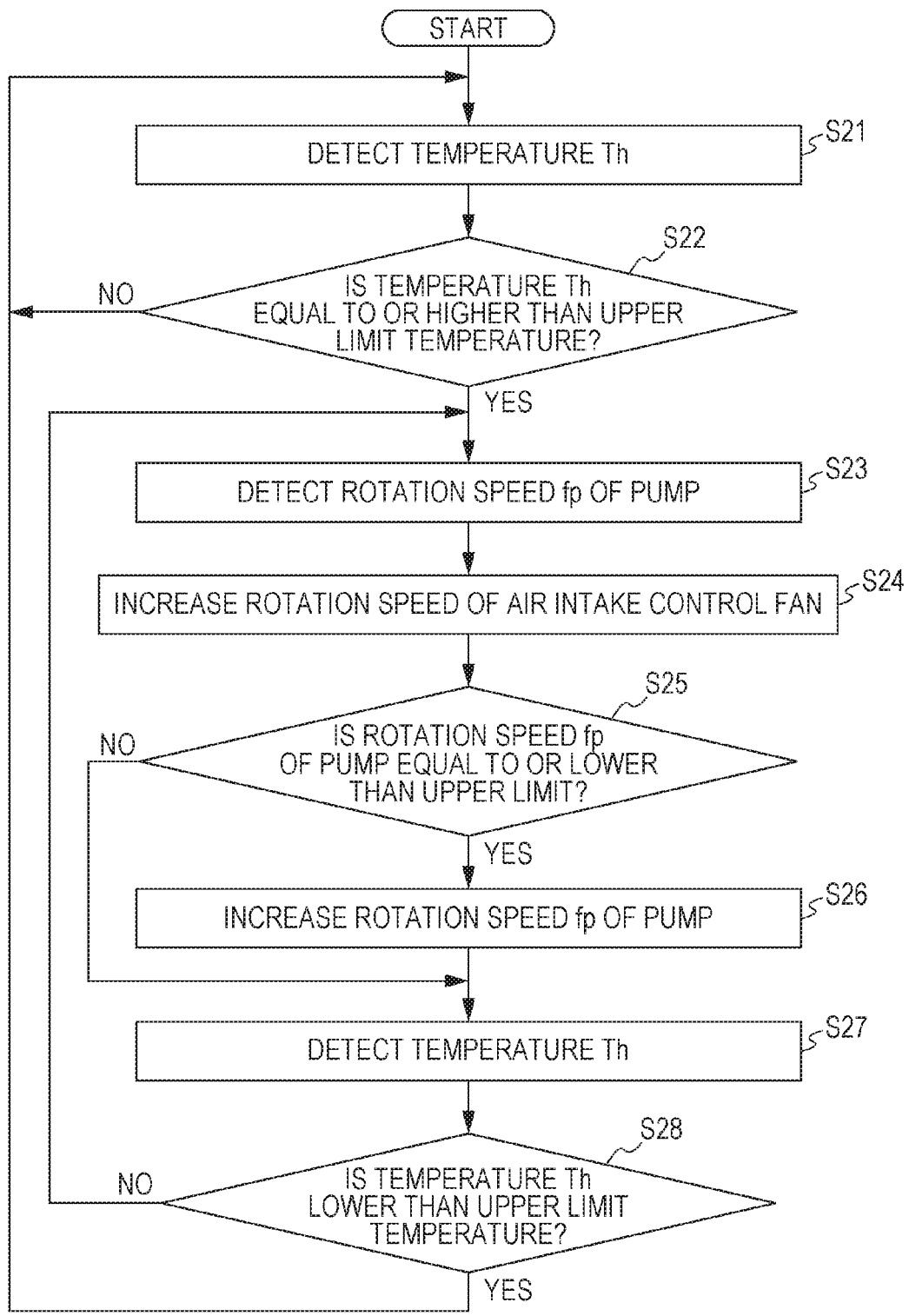
FIG. 11 is a flowchart of a control executed by a control circuit.

Next, with reference to the flowchart of FIG. 11, a description is given of a control which is executed by the control circuit 50 to adjust the temperature of the working fluid in the evaporator 44. By executing the control illustrated in FIG. 11, the temperature of the working fluid at a particular position in the evaporator 44 approximates to the target temperature. The particular position is the position where the temperature sensor 35 is provided, for example.

Steps S21 to 23 and S25 to S28 of the flowchart in FIG. 11 correspond to steps S1 to S3 and S5 to S8 of the flowchart in FIG. 3, respectively, and the description of those steps is omitted.

In Embodiment 3, the temperature of the working fluid is reduced by reducing the temperature of the combustion gas G. Specifically, the rotation speed fp of the intake-air control fan 38 is increased (step S24). When the rotation speed fp of the intake-air control fan 38 is increased, the amount of low-temperature air to be used in combustion increases. The temperature of the combustion gas G generated by combustion can be thereby reduced. In such a manner, the temperature of the working fluid in the evaporator 44 can be adjusted by controlling the temperature of the combustion gas G. If the rotation speed fp of the intake-air control fan 38 is increased excessively, excess air supply leads to a risk that the combustion cannot be maintained. Accordingly, it is desirable that the rotation speed fp of the intake-air control fan 38 is maintained less than a predetermined upper limit.

Figure 12:
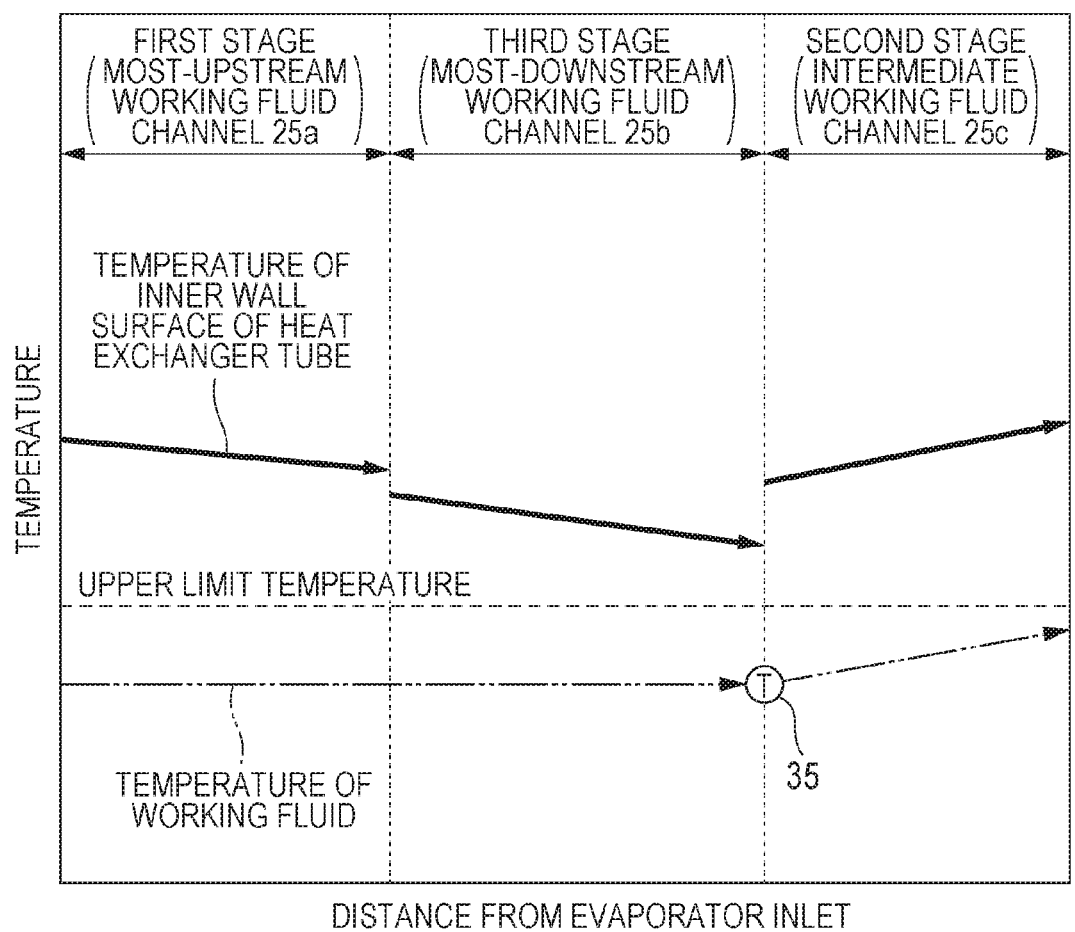
FIG. 12 is a diagram showing a relationship between the temperature of working fluid and the temperature of inner wall surfaces of heat exchanger tubes in the evaporator.

FIG. 12 is the same diagram as FIG. 4, illustrating a relationship between the temperature of the working fluid and the temperature of the inner wall surfaces of the heat exchanger tubes in the evaporator 44. In Embodiment 3, the temperature of the inner wall surfaces of the heat exchanger tubes 28 is the highest at the outlet of the evaporator 44. In Embodiment 3, the working fluid is maintained in the gas-liquid two-phase state all through the most-upstream working fluid channel 25a. Accordingly, thermal decomposition of the working fluid can be prevented. It is certainly not inhibited that the working fluid changes from the gas-liquid two-phase state to the gas-phase state in the most-upstream working fluid channel 25a. Moreover, another temperature sensor (a second temperature sensor) may be attached to the connecting tube 29 connected to the downstream end 25p of the most-upstream working fluid channel 25a.

In Embodiments 1 and 2, the inlet of the evaporator 24 or 34 is composed of one of the heat exchanger tubes 28 constituting the most-downstream working fluid channel 25b. Accordingly, the combustion gas G exchanges heat with the working fluid of low temperature flowing through the most-downstream working fluid channel 25b even in the latter part of the evaporator 24 or 34 as a heat exchanger. On the other hand, according to Embodiment 3, the temperature of the working fluid with which the combustion gas G exchanges heat in the latter part of the evaporator 44 as a heat exchanger depends on the state of the working fluid in the most-downstream working fluid channel 25b. The lower the temperature of the working fluid, the larger the heat recovered from the combustion gas. From the viewpoint of increasing the heat exchange efficiency, it is desirable that the working fluid is in the gas-liquid two-phase state in a part or all of the most-downstream working fluid channel 25b.

Embodiment 4

Figure 13:
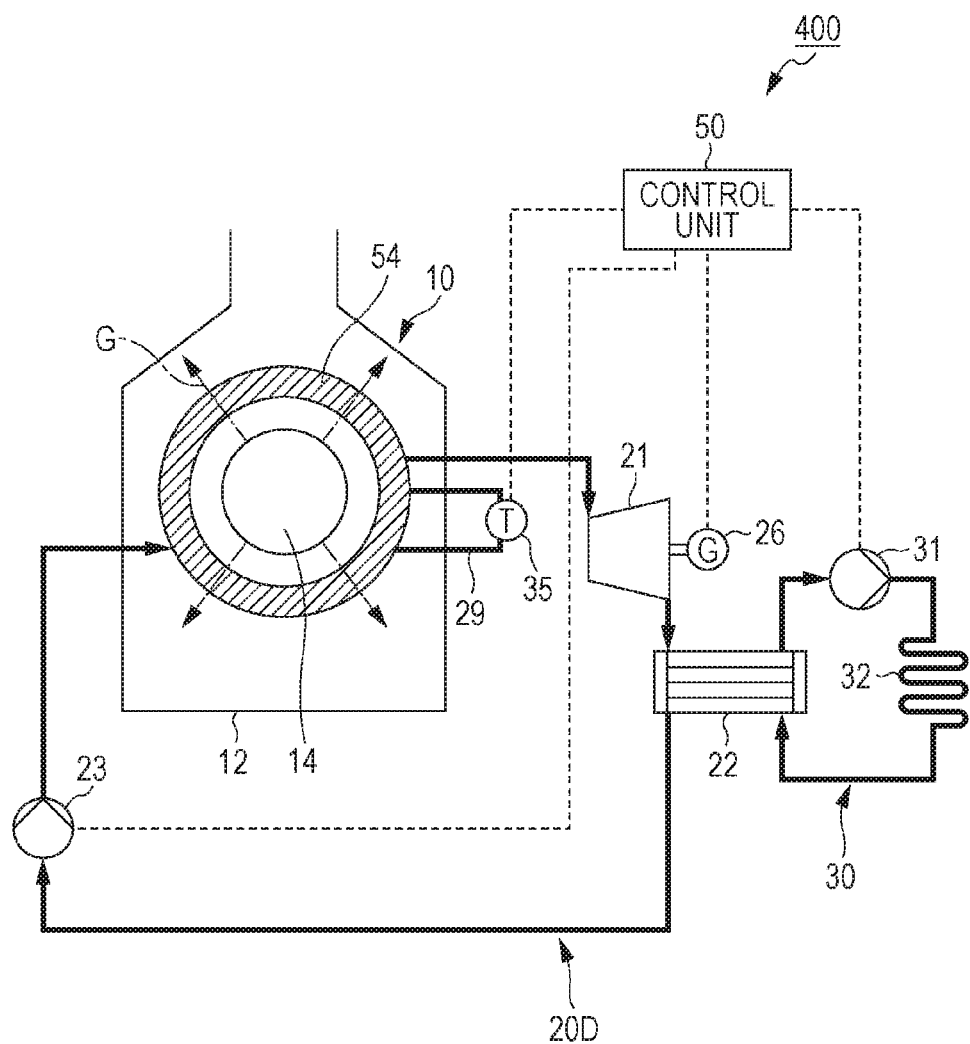
FIG. 13 is a configuration diagram of a CHP system according to Embodiment 4 of the disclosure.

As illustrated in FIG. 13, a CHP system 400 of Embodiment 4 includes the boiler 10, a Rankine cycle apparatus 20D, the heat medium circuit 30, and the control circuit 50. The configuration of the CHP system 400 of Embodiment 4 is the same as that of the CHP system 100 of Embodiment 1 except an evaporator 54 and a combustor 14 of the Rankine cycle apparatus 20D.

Figure 14:
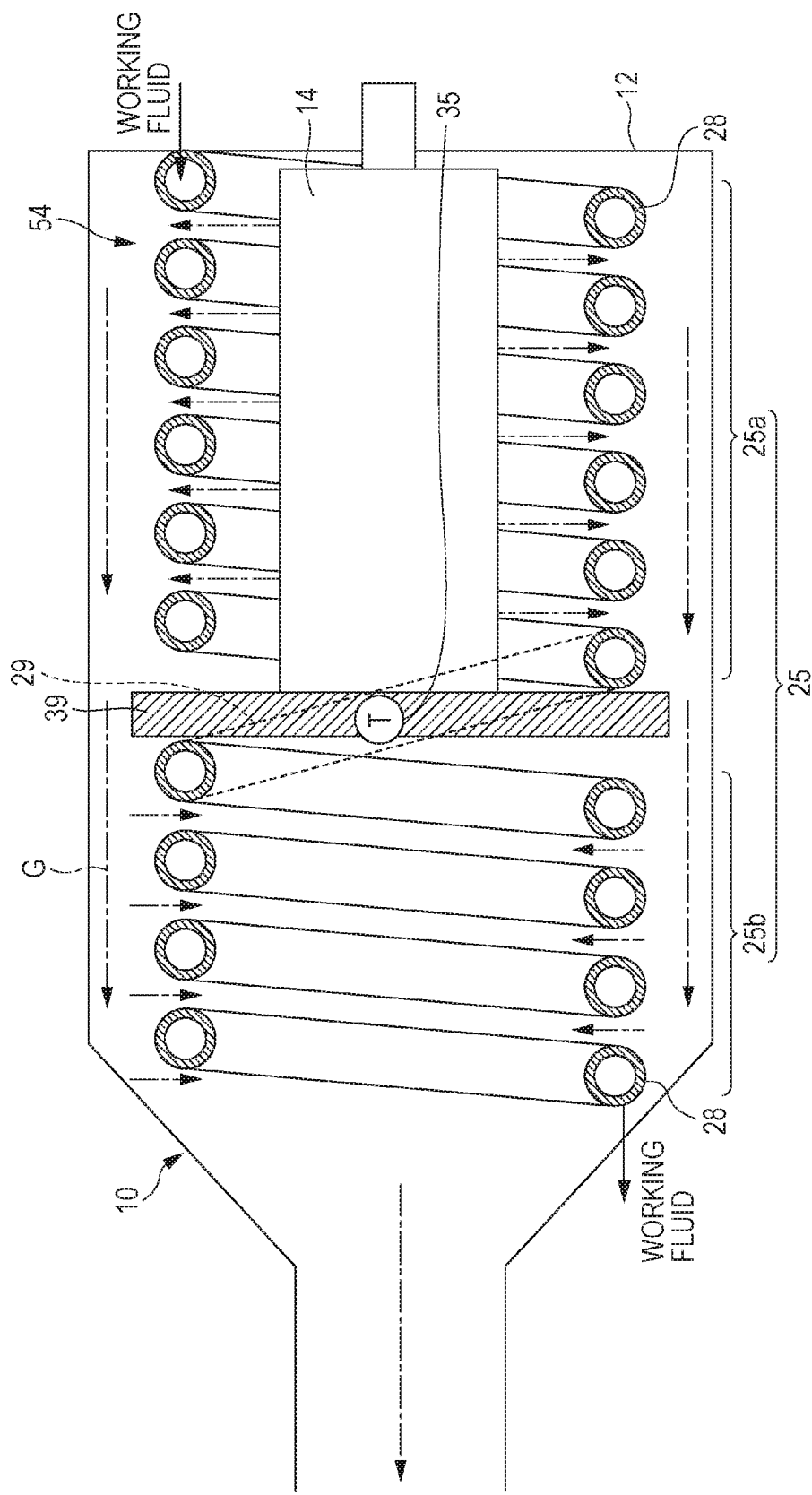
FIG. 14 is a configuration diagram of an evaporator of a Rankine cycle apparatus illustrated in FIG. 13.

As illustrated in FIGS. 13 and 14, in Embodiment 4, the combustor 14 is cylindrical. The evaporator 54 is a coil-type heat exchanger including a coil-type heat exchanger tube 28. The working fluid channel 25 is composed of plural stages in the flow direction of the combustion gas G which exchanges heat with the working fluid. In Embodiment 4, the working fluid channel 25 is composed of two stages. Specifically, the working fluid channel 25 is composed of a most-upstream working fluid channel 25a and a most-downstream working fluid channel 25b. The most-upstream working fluid channel 25a is formed at a position relatively close to the combustor 14, and the most-downstream working fluid channel 25b is formed at a position relatively far from the combustor 14. The inlet of the evaporator 54 is composed of the most-upstream working fluid channel 25a, and the outlet of the evaporator 54 is composed of the most-downstream working fluid channel 25b.

Between the gas-upstream and most-downstream working fluid channels 25a and 25b, a flow-path changing structure 39 is provided. The flow-path changing structure 39 is provided between the inlet to receive the combustion gas G (the inlet of the evaporator 54) and the outlet to discharge the combustion gas G (the outlet of the evaporator 54) and is configured to interrupt the flow of the combustion gas G and change the flow direction of the combustion gas G. The flow direction of the combustion gas G is different between in the inlet side and in the outlet side. The space formed between the inner wall surface of the combustion chamber 12 and the flow-path changing structure 39 constitutes an exhaust path of the combustion gas G. In a similar manner, the space between the inner wall surface of the combustion chamber 12 and the heat exchanger tubes 28 constitutes the exhaust path of the combustion gas G. The flow-path changing structure 39 can be a baffle plate located between the gas-upstream and most-downstream working fluid channels 25a and 25b. The baffle plate has a circular profile in a plan view, for example. The flow-path changing structure 39 can determine the flow direction of the combustion gas G so that heat exchange is performed efficiently.

The working fluid channel 25 may be composed of one heat exchanger tube 28 having a coil form or may be composed of plural exchanger tubes 28. Each of the gas-upstream and most-downstream working fluid channels 25a and 25b may be composed of one heat exchanger tube 28 having a coil form or may be composed of plural exchanger tubes 28. In Embodiment 4, the heat exchanger tubes 28 constituting the gas-upstream and most-downstream working fluid channels 25a and 25b are coaxially located and are connected to each other with a connecting tube 29. At least a part of the connecting tube 29 is placed outside of the combustion chamber 12. The temperature sensor 35 and connecting tube 29 may be surrounded by a heat insulator (Embodiment 1) or a partition (Embodiment 2).

The temperature sensor 35 is provided downstream of the downstream end of the most-upstream working fluid channel 25a in the working fluid channel 25. Specifically, the temperature sensor 35 is attached to the connecting tube 29 in the outside of the combustion chamber 12. Similarly to Embodiments 1 to 3, the control to prevent thermal decomposition of the working fluid can be executed based on the output value of the temperature sensor 35. The temperature sensor 35 may be attached to one of the heat exchanger tubes 28 constituting the working fluid channel 25 in the combustion chamber 12.

In a region near the combustor 14, the combustion gas G has high temperature. Accordingly, it is desirable that the working fluid is in the gas-liquid two-phase state or low-temperature gas phase in the region near the combustor 14. On the other hand, in a region distant from the combustor 14, the combustion gas G has low temperature. Accordingly, the working fluid is allowed to be in the gas phase in the region distant from the combustor 14. In this light, the state (temperature) of the working fluid in the evaporator 54 needs to be adjusted by using the temperature 35 provided downward of the downward end of the most-upstream working fluid channel 25a in a similar manner to Embodiments 1 to 3.

In the CHP system 400 of Embodiment 4, the working fluid channel 25 is provided around the combustor 14. Accordingly, the CHP system 400 of Embodiment 4 can be made compact as a whole compared with the CHP systems of the other embodiments.

The technique disclosed in the specification is suitable for not only heat recovery systems that recover heat with working fluid and use the recovered heat but also cogeneration systems such as CHP systems. The technique disclosed in the specification is particularly suitable for systems frequently changing in electricity demand. Moreover, the technique disclosed in the specification is applicable to every system including a process of heating the working fluid with high-temperature fluid, such as high-temperature heat pumps.

What is claimed is:
1. An evaporator which heats working fluid with high-temperature fluid to evaporate the working fluid, the evaporator comprising:
   a working fluid channel which is arranged in a flow direction of the high temperature fluid and through which the working fluid flows;
   a temperature sensor which is provided for the working fluid channel; and
   a combustor which has a cylindrical shape, and which generates the high-temperature fluid and feeds the high-temperature fluid radially from a central axis of the cylindrical shape, wherein
   a part of the working fluid channel is exposed to outside of a housing of the evaporator,
   the temperature sensor is provided in the part of the working fluid channel exposed to the outside of the housing of the evaporator in a region other than an inlet of the working fluid channel into which the working fluid flows from the outside of the evaporator and other than an outlet of the working fluid channel through which the working fluid flows out of the evaporator, an output value of the temperature sensor is used to adjust temperature of the working fluid in the evaporator, and the working fluid channel has a coil shape and is provided around the combustor, and wherein in a cross-sectional view of the evaporator, the working fluid channel includes: a first section which overlaps the combustor; and a second section which is located downstream of the first section in the flow direction of the working fluid and does not overlap the combustor, and the temperature sensor is provided between the first and second sections in the part of the working fluid channel exposed to the outside of the housing of the evaporator.

2. The evaporator according to claim 1, wherein the evaporator is a coil heat exchanger.

3. The evaporator according to 1, further comprising:

a flow-path changing device which is provided between an inlet for receiving the high-temperature fluid and an outlet for discharging the high-temperature fluid and interrupts the flow of the high-temperature fluid to change the flow direction of the high-temperature fluid.

\* \* \* \* \*